US011841725B1

United States Patent
Ramesh et al.

(10) Patent No.: US 11,841,725 B1
(45) Date of Patent: Dec. 12, 2023

(54) SYSTEMS AND METHODS FOR OPTIMIZING LOADING OF SOLAR INVERTERS

(71) Applicant: 8ME NOVA, LLC, El Dorado Hills, CA (US)

(72) Inventors: Gautham Ramesh, Emeryville, CA (US); Finbar Sheehy, San Francisco, CA (US)

(73) Assignee: 8ME NOVA, LLC, El Dorado Hills, CA (US)

( * ) Notice: Subject to any disclaimer, the term of this patent is extended or adjusted under 35 U.S.C. 154(b) by 0 days.

(21) Appl. No.: 18/209,973

(22) Filed: Jun. 14, 2023

Related U.S. Application Data

(62) Division of application No. 18/116,131, filed on Mar. 1, 2023, now Pat. No. 11,726,517.

(51) Int. Cl.
G05F 1/67 (2006.01)
H02J 3/38 (2006.01)

(52) U.S. Cl.
CPC .............. *G05F 1/67* (2013.01); *H02J 3/381* (2013.01); *H02J 2203/20* (2020.01); *H02J 2300/24* (2020.01)

(58) Field of Classification Search
CPC ......... G05F 1/67; H02J 3/381; H02J 2300/24; H02J 2203/20
USPC ...... 320/101; 307/43, 45, 52, 53, 55, 58, 59, 307/70, 82, 85, 86, 11, 18, 19, 20, 24, 29, 307/31, 32, 35, 38, 39, 112, 113, 116, 307/125, 126

See application file for complete search history.

(56) References Cited

U.S. PATENT DOCUMENTS

| | | | | |
|---|---|---|---|---|
| 8,084,892 B2 * | 12/2011 | Yasugi | .................... | H02J 3/381 |
| | | | | 307/130 |
| 8,212,399 B2 * | 7/2012 | Besser | .................... | H02J 3/381 |
| | | | | 307/18 |
| 8,239,149 B2 * | 8/2012 | Nuotio | .................... | H02S 50/10 |
| | | | | 702/182 |
| 8,859,884 B2 * | 10/2014 | Dunton | ................ | H03K 17/687 |
| | | | | 370/243 |
| 9,496,710 B2 * | 11/2016 | Narla | ....................... | H02J 3/388 |
| 9,502,904 B2 * | 11/2016 | Bhavaraju | ............... | H02J 3/381 |
| 9,515,489 B2 * | 12/2016 | Togashi | .................. | H02J 3/381 |
| 9,917,443 B2 * | 3/2018 | Falk | .................. | H02M 7/53871 |

(Continued)

*Primary Examiner* — Richard V Muralidar
(74) *Attorney, Agent, or Firm* — Foley & Lardner LLP

(57) ABSTRACT

A solar power system including a first solar module group comprising one or more first solar modules; a second solar module group comprising one or more second solar modules; a first inverter coupled with the first solar module group and the second solar module group; a second inverter coupled with the first solar module group and the second solar module group; and a controller comprising a processor coupled with memory. The processor (i) operates the first inverter and the second inverter in a first control position in which the first inverter draws energy from the first solar module group and the second inverter draws energy from the second solar module, and, when a combined output of the first solar module group and the second solar module group is below a threshold percentage of a maximum output of the first inverter or the second inverter, (ii) operates the first inverter and the second inverter in a second control position in which the first inverter draws energy from the first solar module group and the second module group.

20 Claims, 17 Drawing Sheets

(56) References Cited

U.S. PATENT DOCUMENTS

| | | | |
|---|---|---|---|
| 11,726,517 B1 * | 8/2023 | Ramesh | H02J 3/381 |
| | | | 320/108 |
| 2011/0232714 A1 * | 9/2011 | Bhavaraju | H02J 3/381 |
| | | | 307/82 |
| 2023/0170844 A1 * | 6/2023 | Xu | H02S 40/32 |
| | | | 136/244 |

* cited by examiner

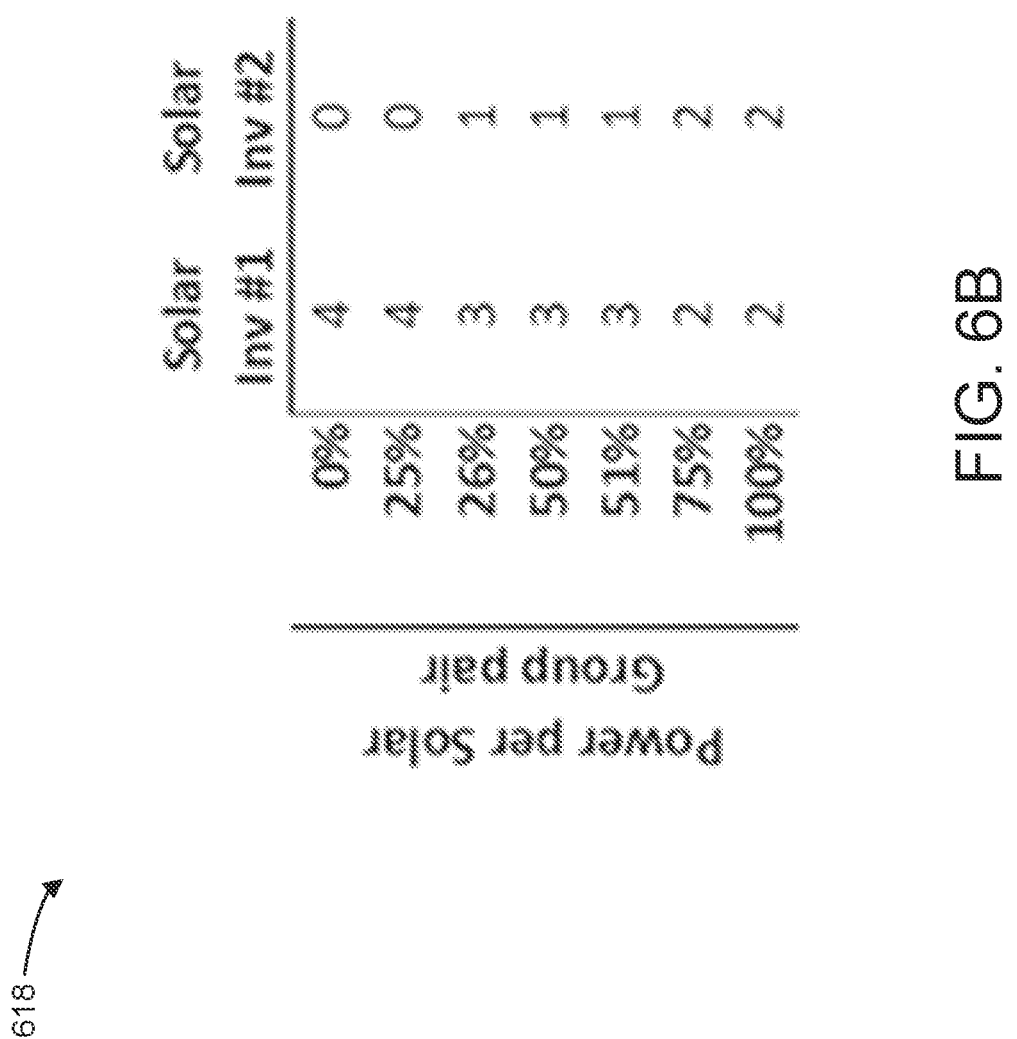

SYSTEMS AND METHODS FOR OPTIMIZING LOADING OF SOLAR INVERTERS

CROSS-REFERENCE TO RELATED APPLICATIONS

This application claims the benefit of priority as a Divisional to U.S. patent application Ser. No. 18/116,131, filed Mar. 1, 2023, the entirety of which is incorporated by reference herein.

BACKGROUND

Solar modules produce electrical power that flows in a single direction (called Direct Current, or DC). By placing solar modules in series with each other, it is possible to sum the voltages they produce, so that the modules all share a common operating current, while the voltage across the full string of modules is the sum of the voltages across the individual modules. This summation of voltages can reach a practical limit.

In a large solar array, the generated electrical energy may travel a considerable distance (in some cases on the order of kilometers) to get to the collection point (e.g., the electrical load and/or the point of interconnection to the electrical grid). The electrical lines carrying the energy from each solar module to the collection point can lose a portion of the energy they carry due to resistive losses, which convert some of the energy into heat. Resistive losses are proportional to the resistance of the line and to the square of the current flowing in the line. At the same time, the power carried by the line is proportional to the voltage multiplied by the current. To minimize electrical losses, power can be transmitted at a very high voltage (and thus a relatively low current) rather than at a relatively low voltage and very high current. The practical limitations on generating high DC voltages may not apply to alternating current (AC) voltages, because, unlike DC voltage, AC voltages can be increased through the use of transformers. However, to make it possible to use transformers, the electrical output of the solar array must first be converted from DC to AC, and this function can be performed by devices called solar inverters.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

FIG. 6B illustrates a schedule for switching solar module groups between inverters, according to some embodiments;

Figure 1A:
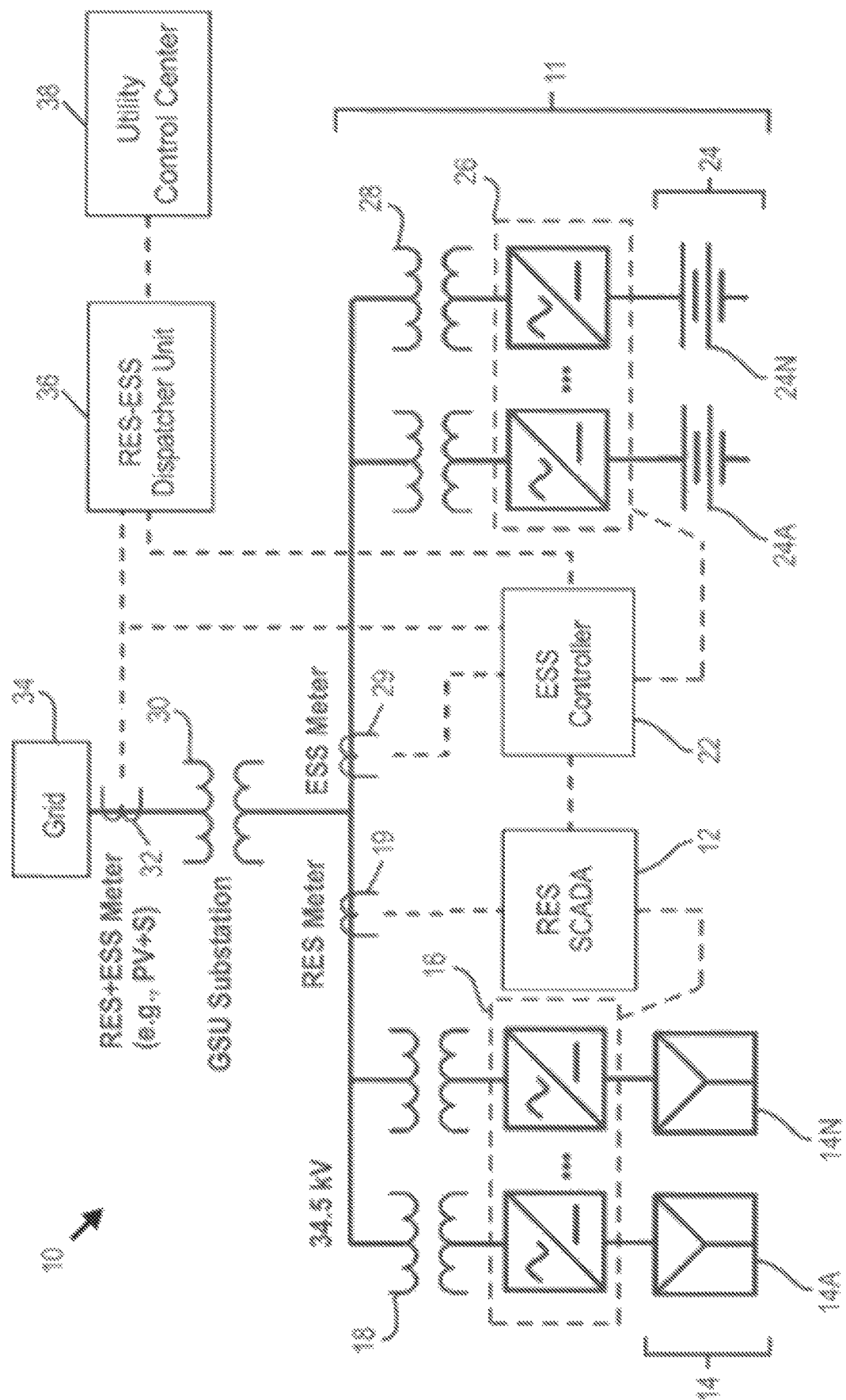
FIG. 1A is a schematic diagram of a metering and control system for controlling a renewable energy source and an energy storage system, according to some embodiments.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Further, in the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

In conventional solar energy systems, it can be common to connect a number of solar modules in series, then apply the resulting output to a solar inverter for conversion from DC to AC. These connections are commonly fixed, or hardwired and not reconfigurable. When a solar array is generating at or near its maximum power level, the usual design of a conventional system often results in solar inverters of the system generating DC output at or near the maximum rated power level of the solar inverters. However, in the morning hours after sunrise, and in the afternoon or evening hours leading up to sunset, for example, a solar array may not be capable of driving the solar inverters to the maximum output power of the solar inverters. In such cases, the solar inverters can operate at "partial load." Operating at partial load can cause the inverters to lose efficiency because solar inverters commonly achieve their highest electrical operating efficiency when operated close to the maximum output power of the inverters. Solar inverters (i.e., inverters connected with solar panel module groups) also commonly operate at the solar inverters' lowest operating efficiency when operating at low output powers. The low efficiency can occur because solar inverters can use a certain amount of power (the "no-load loss" or NLL) to operate or stay in a powered or "on" state, even when the inverters have little or no power throughput.

A processor implementing the systems and methods discussed herein may overcome the aforementioned technical deficiencies by dynamically controlling a switching system that connects different groups of solar modules with different inverters. For example, a solar power system can include (i) two solar module groups that each include one or more solar modules (e.g., solar modules connected in series), and (ii) two inverters (e.g., solar inverters). The solar module groups can be connected with the inverters through a switching system. The switching system can be configured to connect the solar module groups in different configurations or positions. A processor of a controller of the solar power system can send or transmit control signals to the switching system to control the switches that connect the inverters with the different solar module groups. The processor can control the switching system to connect the solar module groups with the inverters based on the power output of the solar module groups. The processor can control the switching system such that the solar module groups output power to maximize the power throughput of individual inverters. In doing so, the processor can shut off the inverters to which the solar module groups are not providing power. In this way, the processor can control the solar module groups to provide power to inverters to operate at or close to a full load for efficient power conversion while reducing the power loss of inverters that are not being used and reducing the number of inverters that operate at "partial load."

The processor can determine a position or configuration for the switching system based on the amounts of power the individual solar energy module groups generate. For example, the processor can monitor the power output (e.g., the current power outputs) of each of the solar energy module groups. The processor can combine the power outputs together to generate a combined power output of the solar panel groups. The processor can compare the combined power output of the solar panel groups with a threshold percentage of the maximum power ratings (e.g., the total maximum power ratings or a power rating in which the inverters operate at the highest efficiencies) of the inverters connected to the solar panel groups. Responsive to determining the combined power output of the solar panel groups exceeds a threshold percentage of the maximum power rating of an inverter, the processor can transmit a control signal to the switching system to cause the solar panel groups to individually output power to the individual inverters. Responsive to determining the combined power output of the solar panel groups is less than the threshold percentage of the maximum power rating, the processor can transmit a control signal to the switching system to cause each of the solar energy module groups to output power to a single one of the inverters. The processor can transmit control signals to any disconnected or non-connected inverters to power off or shut down the disconnected inverters. Accordingly, the processor can maximize the output power going to individual inverters to increase the efficiency of the powered inverters while reducing the no-load loss of the inverters that are not being powered.

Inverter Load Management System

Referring now to FIG. 1A, a schematic diagram showing interconnections between various components of an AC coupled metering and control system 10 for controlling a renewable electrical energy generation device 14 including multiple generation units 14A-14N (such as a photovoltaic (PV) array including photovoltaic units) and an energy storage device 24 including multiple energy storage units 24A-24N (such as a battery array including battery units) chargeable with electric power produced by the renewable electrical energy generation device 14 in a RES–ESS facility 11 is shown, according to one embodiment. The RES–ESS facility 11 may combine a renewable electrical energy generation device 14 (e.g., such as an array of PV panels, wind turbines, or the like), and an energy storage device 24 (e.g., an array of lithium-based batteries) that may be coupled to a single substation 30 and/or located in a single property, area, or structure.

FIG. 1A illustrates an RES–ESS facility 11 that uses inverters 16, 26 to convert DC power produced by a renewable electrical energy generation device 14 (e.g., a PV array in certain embodiments) or power released by the energy storage device 24 to AC power for coupling to an AC electrical grid 34 (e.g., a utility grid operated by a processor separate from the RES–ESS facility 11). In certain embodiments, the RES–ESS facility 11 may embody a DC-coupled RES–ESS facility. In certain embodiments, an energy storage device 24 may include at least one of (or a combination of) energy storage units 24A, 24B using various constructions and chemistries, capacitors, or mechanical energy storage devices such as flywheels or pumped-hydro installations. In certain embodiments, an energy storage device 24 may include at least one hydrolysis unit (e.g., configured to electrolyze water to release hydrogen) and a hydrogen storage unit (e.g., adsorbent media for releasably binding hydrogen, storage vessels, and/or reversible chemical reactant vessels or beds). In certain embodiments, an energy storage device 24 may include electrical charge storage devices such as batteries, optionally augmented with capacitors.

In certain embodiments, a RES–ESS dispatcher unit 36 has the ability to control the charge or discharge of the energy storage device 24 (e.g., batteries) by communicating with an ESS controller 22. The ESS controller may be located in the RES–ESS facility 11. A RES SCADA (supervisory control and data acquisition) controller 12 may be operatively coupled with RES inverters 16 associated with the renewable electrical energy generation device 14 (optionally embodied in a PV array), and the ESS controller 22 may be operatively coupled with ESS inverters 26 associated with the energy storage device 24. Both the RES SCADA controller 12 and the ESS controller 22 may be in communication with the RES–ESS dispatcher unit 36. In certain embodiments, a utility control center 38 (e.g., of an electric power utility or grid operator) may communicate with the RES–ESS dispatcher unit 36 using DNP3 and set different configuration options. Additionally, the RES–ESS dispatcher unit 36 may receive or generate an accurate renewable generation forecast (e.g., solar generation forecast). The RES–ESS dispatcher unit 36 may use the forecast to implement control algorithms, such as CCD and other control modes.

As shown in FIG. 1A, certain embodiments may utilize readily available electric power meters, such as a RES+ESS electrical power meter 32 to measure RES–ESS (e.g., PV+S) facility output, a RES electrical power meter 19 to measure RES output, and an ESS electrical power meter 29 to measure ESS output. Signals from the RES electrical power meter 19 are provided to the RES SCADA controller 12, and signals from the ESS electrical power meter 29 are provided to the ESS controller 22. The electric power generated by the RES–ESS facility 11 may be provided to an electric power system (e.g., an AC electrical grid 34) via a generator step-up (GSU) substation 30 that implements protection and appropriate voltage conversion. RES transformers 18 and ESS transformers 28 may be arranged between the inverters 16, 26, respectively, and the GSU substation 30 to provide voltage conversion utility (e.g., to supply AC power signals to the GSU substation 30 at 34.5 kV in certain implementations).

Figure 1B:
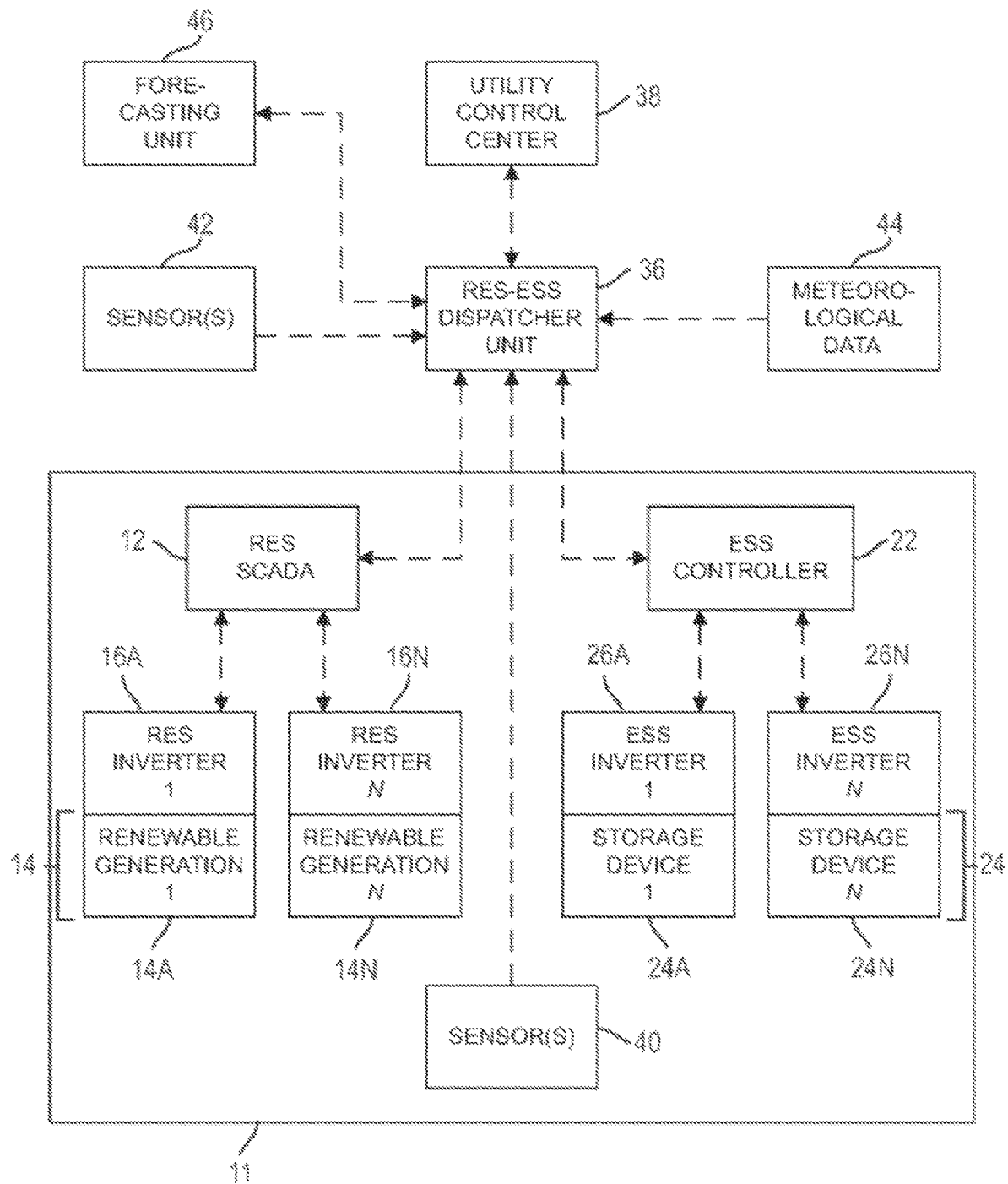
FIG. 1B is a schematic diagram showing certain components of the metering and control system of FIG. 1A, according to some embodiments.

Referring now to FIG. 1B, a schematic diagram showing certain components of the AC coupled metering and control system of FIG. 1A, including interconnection of control- and sensor-related components is shown, according to one embodiment. As shown in FIG. 1B, the RES–ESS dispatcher unit 36 may be arranged between a utility control center 38 and a RES–ESS facility 11. Within the RES–ESS facility 11, a RES SCADA controller 12 may be operatively coupled with RES inverters 16A-16N (wherein N represents any suitable number) that are configured to provide AC conversion of DC power produced by renewable electrical energy generation units 14A-14N (e.g., arrangeable as parts of a renewable electrical energy generation device 14). Similarly, within the RES–ESS facility 11, an ESS controller 22 may be operatively coupled with ESS inverters 26A-26N that are configured to provide AC conversion of DC power supplied by energy storage units 24A-24N (e.g., arrangeable as parts of an energy storage device 24). In some embodiments, the RES–ESS facility 11 further includes at least one sensor 40, which may comprise one or more sky imaging sensors useful to determine sky conditions (such as the presence of clouds or lack thereof) proximate to the RES–ESS facility 11, with output signals from the at least one sensor 40 being supplied to the RES–ESS dispatcher unit 36. The RES–ESS dispatcher unit 36 may also receive: (i) signals from one or more sensors 42 (e.g., satellite imaging sensors or the like) not necessarily associated with the RES–ESS facility 11; (ii) meteorological data provided by a meteorological modeling unit 44; (iii) signals from a forecasting unit 46 that may forecast generation by the renewable electrical energy generation device 14 and/or one or more other renewable electrical energy generation devices or units. In certain embodiments, time-dependent forecasting of electrical energy production may be performed by the forecasting unit 46 or may be performed by the RES–ESS dispatcher unit 36. In certain embodiments, a time-dependent forecast of electrical energy production may utilize one, two, or all three of the following: on-site sky imaging provided by the sensor(s) 40, satellite imaging provided by the sensor(s) 42, and meteorological data provided by the meteorological modeling unit 44. In certain embodiments, sensors of other types may be used.

Figure 2:
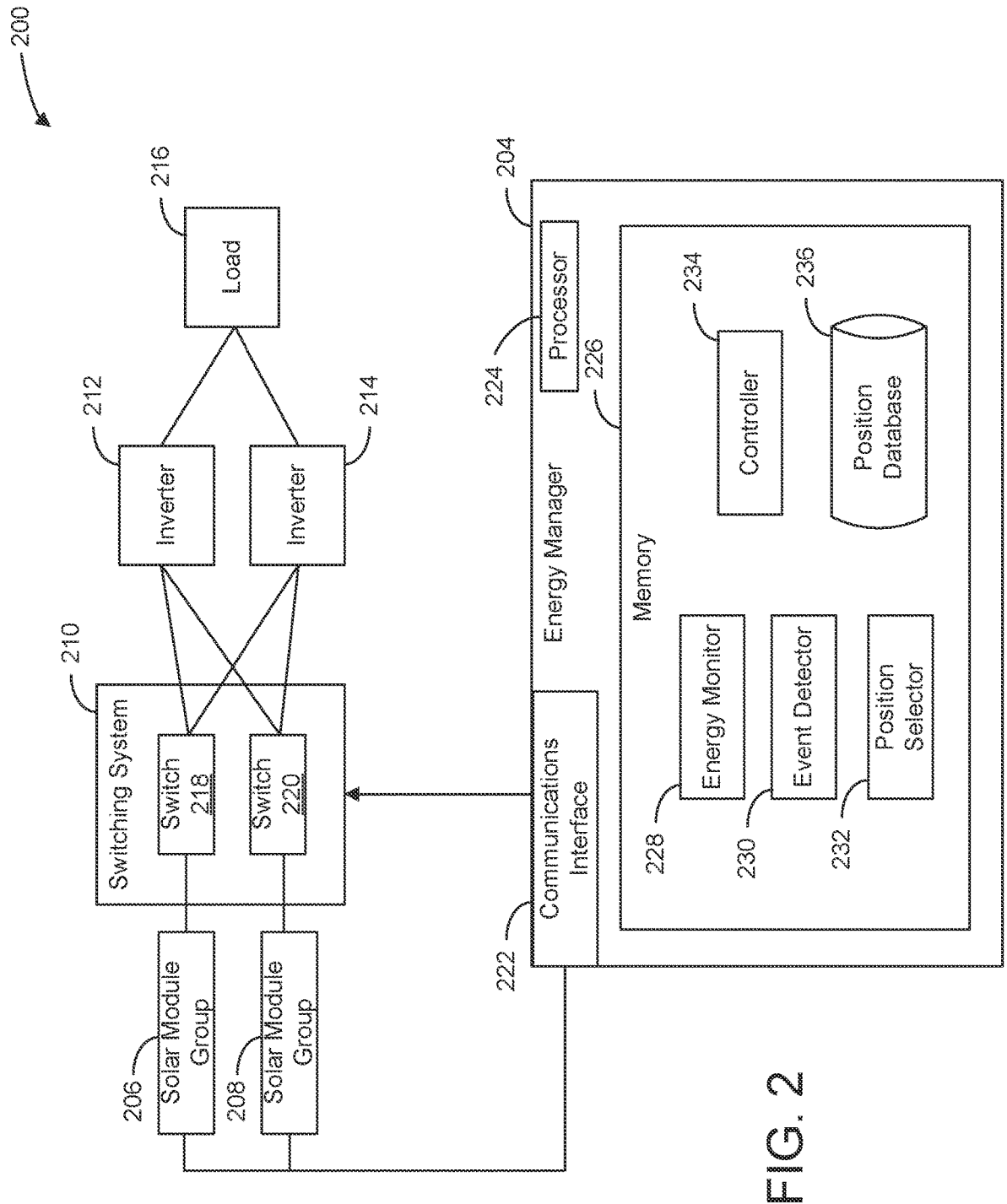
FIG. 2 illustrates a block diagram of an example system for controlling the output of solar module groups between inverters, according to some embodiments.

Referring now to FIG. 2, a block diagram of an example system 200 for controlling the output of solar module groups between inverters is shown, according to some embodiments. In brief overview, the system 200 can include an energy manager 204, solar module groups 206 and 208, a switching system 210, inverters 212 and 214, and a load 216. The energy manager 204 can monitor the solar module groups 206 and 208 to determine real-time power output of the solar module groups 206 and 208. Based on the power outputs of the solar module groups 206 and 208, the energy manager 204 can determine positions or configurations of the switching system 210 to connect the solar module groups 206 and 208 to the inverters 212 and 214. The inverters 212 and 214 can convert the DC power output of the solar module groups 206 and 208 into an AC power output and provide the converted power to the load 216. Thus, the energy manager 204 can optimize the efficiency of the inverters 212 and 214 based on the current power output of the solar module groups 206 and 208. The system 200 may include more, fewer, or different components than shown in FIG. 2. For example, there may be any number of client devices or computers that make up or are a part of the energy manager 204 or networks in the system 200. Further in some embodiments, the energy manager 204 can control the "on" or "off" state of the inverters 212 and 214.

The solar module groups 206 and 208 can each be a PV array. The solar module groups 206 and 208 can respectively be renewable energy sources of the renewable electrical energy generation units 14A-14N, shown and described with reference to FIGS. 1A and 1B. The inverters 212 and 214 can be solar inverters. The solar module groups 206 and 208 can each include one or more solar modules. The solar modules in one or both of the solar module groups 206 and 208 can be connected in series. The solar modules can each include one or more solar panels configured to generate electrical energy (e.g., DC energy) from sunlight that the solar modules receive. Each of the solar module groups 206 and 208 can be connected with the inverters 212 and/or 214 through the switching system 210. The system 200 can include any number of such solar module groups connected with the inverters 212 and/or 214.

The inverters 212 and 214 can be or include DC to AC converters. The inverters 212 and 214 can be the inverters of the inverters 16A-16N, shown and described with reference to FIGS. 1A and 1B. The inverters 212 and 214 can each include or be connected with a transformer. The inverters 212 and 214 can operate most efficiently when operating at or near (e.g., at a maximum operating efficiency of) the respective inverters' 212 and 214 maximum operating power. The inverters 212 and 214 can each receive DC power from the solar module groups 206 and/or 208 through the switching system 210. The inverters 212 and 214 can convert the DC power into AC power. The inverters 212 and 214 can output the converted power to the load 216. The system 200 can include any number of such inverters connected with the load 216 and/or with the solar module groups 206 and 208.

The load 216 can be any load that is powered by the output power of the inverters 212 and/or 214 or that otherwise stores energy from the inverter 212 and/or 214. The load 216 can be a device that operates from the power provided by the inverters 212 and/or 214 or can be an energy storage system, such as a battery (e.g., a battery energy storage system, or BESS) of a renewable energy facility (e.g., the RES–ESS facility 11) after converting the AC power back to DC power, or a power grid (e.g., the grid 34).

The switching system 210 can be configured to selectively connect the solar module groups 206 and 208 with the inverters 212 and/or 214. The switching system 210 can be or include switches 218 and 220 and/or any number of switches. In some embodiments, the switching system 210 can include a controller that controls the switches of the switching system 210. The controller can receive control signals from the energy manager 204 and operate the switches according to the control signals. In some cases, the switching system 210 is a series of physical switches that are directly controlled by control signals from the energy manager 204 without a separate controller. The switching system 210 can connect the solar module groups 206 and 208 with the inverters 212 and 214 based on control signals that the switching system 210 receives from the energy manager 204. The switching system 210 can receive output power from the solar module groups 206 and 208 and direct or redirect the power to the inverters 212 and 214. The energy manager 204 can control the positions of the switches 218 and 220 (e.g., the position of the switching system 210) to control the direction of the output power from the solar module groups 206 and 208. In some embodiments, the positions of the switching system 210 can correspond to control positions as described below.

The energy manager 204 can include or execute on one or more processors or computing devices and/or communicate via a network. The network can include computer networks such as the Internet, local, wide, metro, or other area networks, intranets, satellite networks, and other communication networks such as voice or data mobile telephone networks. The network can be used to access information resources such as web pages, websites, domain names, or uniform resource locators that can be presented, output, rendered, or displayed on at least one computing device, such as a laptop, desktop, tablet, personal digital assistant, smartphone, portable computers, or speaker.

The energy manager 204 can include or utilize at least one processing unit or other logic device such as a programmable logic array engine or a module configured to communicate with one another or other resources or databases. The components of the energy manager 204 can be separate components or a single component. The system 200 and its components can include hardware elements, such as one or more processors, logic devices, or circuits.

The energy manager 204 may comprise one or more processors that are configured to control the positions of the switches (e.g., the switches 218 and/or 220) of the switching system 210. The energy manager 204 may comprise a communications interface 222, a processor 224, and/or memory 226. The energy manager 204 may communicate with the solar module groups 206 and/or 208 and/or devices controlling or measuring the energy or power output (e.g., energy meters, such as the RES electrical power meter 19, shown and described with reference to FIG. 1A) via the communications interface 222. The processor 224 may be or include an ASIC, one or more FPGAs, a DSP, circuits containing one or more processing components, circuitry for supporting a microprocessor, a group of processing components, or other suitable electronic processing components. In some embodiments, the processor 224 may execute computer code or modules (e.g., executable code, object code, source code, script code, machine code, etc.) stored in the memory 226 to facilitate the activities described herein. The memory 226 may be any volatile or non-volatile computer-readable storage medium capable of storing data or computer code.

The memory 226 may include an energy monitor 228, an event detector 230, a position selector 232, a controller 234, and/or a position database 236. In brief overview, the components 228-234 can cooperate to monitor the power output of the solar module groups 206 and 208. Based on the monitored power output, the components 228-234 can control the switching system 210 to selectively output power to the inverters 212 and/or 214 from the solar module groups 206 and/or 208. The components 228-234 can select a position for the switching system 210 from the position database 236 and transmit a control signal to the switching system 210 to control the position of the switching system 210. The components 228-234 can do so to select or optimize the amount of power that is directed to any individual inverter to increase the efficiency of operation of the inverters 212 and/or 214.

The energy monitor 228 may comprise programmable instructions that, upon execution, cause the processor 224 to monitor the power output of the solar module groups 206 and/or 208. For example, the energy monitor 228 can retrieve measurements regarding the amount of power or energy the individual solar module groups 206 and/or 208 are outputting from energy meters (e.g., RES electrical power meter 19) connected (e.g., connected in series) to the solar module groups 206 and/or 208. The energy monitor 228 can communicate with the energy meters over a network, such as via the communications interface 222. The energy monitor 228 can continuously monitor or poll the energy meters at set time intervals or pseudo-randomly to determine the power output of the solar module groups 206 and/or 208. In some embodiments, the energy meters can automatically transmit the measurements to the energy manager 204 at set intervals or pseudo-randomly. The energy monitor 228 can collect such measurements as individual outputs of the solar module groups 206 and 208 and/or as a single combined output (e.g., an aggregation of the power outputs of the solar module groups 206 and/or 208). In some embodiments, the energy monitor 228 can calculate measurements based on the retrieved measurements such as by aggregating measurements of energy outputs by individual solar module groups into an aggregated or combined output.

The event detector 230 may comprise programmable instructions that, upon execution, cause processor 224 to detect events regarding the power output of the solar module groups 206 and/or 208. Events can be determinations to change the position of the switching system 210 (e.g., the positions of the switches within the switching system 210). The event detector 230 can detect such events by comparing the measured values (e.g., the combined output) to various criteria that correspond to different positions of the switching system 210 and determining the measured values satisfy a criterion (e.g., a condition) that corresponds to a different position of the switching system 210 than the current position of the switching system 210.

For example, the memory 226 can store criteria that correspond to a first position of the switching system 210, a second position of the switching system 210, and/or a third position of the switching system 210. In the first position, the switching system 210 can connect the solar module group 206 (e.g., the first solar module group) to the inverter 212 (e.g., a first inverter) and the solar module group 208 (e.g., a second solar module group) to the inverter 214 (e.g., a second inverter). The switching system 210 can connect the solar module groups 206 and 208 such that the solar module group 206 only outputs power to the inverter 212 and the solar module group 208 only outputs power to the inverter 214 (e.g., the switch 218 can connect (e.g., directly connect) the solar module group 206 to the inverter 212, and the switch 220 can connect (e.g., directly connect) the solar module group 208 to the inverter 214). In the second position, the switching system 210 can connect both the solar module group 206 and the solar module group 208 to the inverter 212. The switching system 210 can connect the solar module groups 206 and 208 such that neither of the solar module groups 206 or 208 output power to the inverter 214 (e.g., the switch 218 can connect (e.g., directly connect) the solar module group 206 to the inverter 212, and the switch 220 can connect (e.g., directly connect) the solar module group 208 to the inverter 212). In the third position, the switching system 210 can connect both the solar module group 206 and the solar module group 208 to the inverter 214. The switching system 210 can connect the solar module groups 206 and 208 such that neither of the solar module groups 206 or 208 output power to the inverter 212 (e.g., the switch 218 can connect (directly connect) the solar module group 206 to the inverter 214, and the switch 220 can connect (e.g., directly connect) the solar module group 208 to the inverter 214). The memory 226 can store criteria for any number of positions of the switching system 210.

The criteria and the data for the control signals for the positioning of the switching system 210 can be stored in the position database 236. The position database 236 can be a relational database. The position database 236 can include criteria, identifications of the positions that correspond with the respective criteria, and/or data of control signals that can be used to control the switching system 210. In some embodiments. the different criteria can each have a stored association with different identifications (e.g., numerical or alphanumerical values) of positions of the switching system 210. The identifications of the positions may correspond to data that can be used to control switches of the switching system 210 to be in the respective positions. The event detector 230 can retrieve the criteria from the position database 236 and apply the criteria to measurements the energy monitor retrieves indicating the power output or power outputs of the solar module groups 206 and 208, in some cases in response to retrieval or reception of such measurements.

The criteria can include one or more thresholds. For example, the criteria can include a threshold (e.g., a threshold percentage) that indicates a percentage of a maximum output (e.g., a power capacity or a maximum efficiency power output) of the inverter 212 (e.g., the first inverter) or the inverter 214 (e.g., the second inverter). The maximum output for the inverter 212 and the inverter 214 can be the same or substantially the same. The maximum output or the power capacity can be different between the inverter 212 and the inverter 214. The maximum output can be the output of the first inverter or the second inverter in which the first inverter or the second inverter operates with the highest efficiency. The threshold percentage can be a percentage of such maximum output, such as 50% or any other percentage. A first criterion can be satisfied when the combined output of the solar module group 206 and the solar module group 208 exceeds the threshold percentage. The first criterion can correspond to the first position in which the solar module group 206 outputs energy to the inverter 212 and the solar module group 208 outputs energy to the inverter 212. A second criterion can be satisfied when the combined output of the solar module group 206 and the solar module group 208 is less than the threshold percentage. The second criterion can correspond to the second position in which the solar module group 206 and the solar module group 208 each output power to the inverter 212.

In some embodiments, the criteria can correspond to the history of the position of the switching system 210. For example, a third criterion can correspond to a determination to change the position of the switching system 210 from the first position to another position. The third criterion can indicate to switch to a position different from the position of the switching system 210 immediately prior to the switching system 210 in the first position. For instance, the third criterion can indicate to switch the position of the switching system 210 from the first position to the third position in response to the switching system 210 being in the second position immediately prior to being in the first position. The third criterion can indicate to switch the position of the switching system 210 from the first position to the second position in response to the switching system 210 being in the third position immediately prior to being in the first position. Accordingly, upon being satisfied, the third criterion can cause the switching system 210 to iterate back and forth between the first position, the second position, and the third position. Implementation of the third criterion can distribute the load between different inverters so a single inverter is not operating at all times. The position database 236 can store any number of criteria for any number of positions of the switching system 210.

The event detector 230 can compare the measured power outputs from the solar module groups 206 and/or 208 with the criteria in the position database 236. The event detector 230 can determine a condition or criterion is satisfied based on the comparison. The event detector 230 can identify the position of the switching system 210 that corresponds with the satisfied condition or criterion. The event detector 230 can identify the current position of the switching system 210 (e.g., identify the current position from memory). The event detector 230 can compare the identified position of the satisfied criterion or condition with the current position of the switching system 210. Responsive to determining the current position and the identified position are the same, the event detector 230 can determine no event occurred or was detected. However, responsive to determining the current position and identified position are different, the event detector 230 can detect an event.

In one example, the event detector 230 can receive a measurement from an energy meter measuring the combined power output from the solar module group 206 and the solar module group 208. The event detector 230 can compare the measurement (e.g., the combined output power of the solar module group 206 and the solar module group 208) to a percentage threshold of the maximum output of one of the inverter 212 or the inverter 214. Responsive to determining the measurement is below the percentage threshold, the event detector 230 can identify the position from the position database 236 that corresponds to the criteria associated with a combined power output being below the percentage threshold (e.g., the second position or the third position). The event detector 230 can retrieve the current position of the switching system 210 from the memory 226. The event detector 230 can compare the identified position with the current position. Responsive to determining the positions are different, the event detector 230 can detect an event.

The event detector 230 can detect events based on the amount of time the switching system 210 remains in a single position. For example, the event detector 230 can store and/or maintain a counter or timer that corresponds to the amount of time the switching system 210 remains in a single position. The event detector 230 can initialize the timer or counter upon the controller 234 transmitting a control signal to the switching system 210. The event detector 230 can increment the counter or timer over time until the controller 234 transmits another control signal to change the position of the switching system, at which point the event detector 230 can reset the timer.

In some cases, the event detector 230 may only increment and/or maintain a timer responsive to the controller 234 transmitting a control signal to cause the switching system 210 to be in the second position or the third position. As the event detector 230 increments the counter or timer (e.g., for each increment), the event detector 230 can compare the incremented counter or timer to a threshold (e.g., a time threshold). Responsive to determining the count of the counter or timer exceeds the threshold, the event detector 230 can determine a criterion is satisfied and detect an event. The criterion can correspond to the opposite position of the switching system 210 between the second position and the third position. For example, if the switching system 210 is currently in the second position, the event detector 230 can identify the third position for the event. If the switching system 210 is currently in the third position, the event detector 230 can identify the second position for the event. The event detector 230 can use such criteria to minimize the amount of time any single inverter is powered on and/or converting power from solar module groups.

The position selector 232 may comprise programmable instructions that, upon execution, cause the processor 224 to select positions of the switching system 210. The position selector 232 can select such positions from the position database 236. The position selector 232 can select positions from the position database 236 that correspond to the criteria that the event detector 230 determined to be satisfied and/or that caused the event detector 230 to detect an event. The position selector 232 can identify identifications of the positions for selection based on stored associations between the satisfied criteria and identifications in the position database. The position selector 232 can use the identifications of the positions to retrieve the position data (e.g., data for controlling the switching system 210) from the position database 236, which can be or include a pattern or template of switch positions of switches within the switching system 210. In some embodiments, such position data may have stored associations with the different criteria and the position selector 232 retrieves the position data without performing a second lookup or query from the position database 236.

The controller 234 may comprise programmable instructions that, upon execution, cause the processor 224 to transmit control signals or otherwise control the switching system 210. The controller 234 can transmit control signals to the switching system 210 to change the state, positioning, or configurations of the switches (e.g., the switches 218 and 220). The controller 234 can transmit control signals to the switching system 210 to cause the switching system 210 to be in the position that the position selector 232 selected from the position database 236. For example, the position selector 232 can select the first position from the position database 236. The controller 234 can transmit a control signal to the switching system 210 to cause the switches of the switching system 210 to be in the first position. The position selector 232 can select the second position from the position database 236. The controller 234 can transmit a control signal to the switching system 210 to cause the switches of the switching system 210 to be in the second position. The position selector 232 can select the third position from the position database 236. The controller 234 can transmit a control signal to the switching system 210 to cause the switches of the switching system 210 to be in the third position. The switching system 210 can receive such signals and change position to direct power output from the solar module groups 206 and 208 to the inverter 212 and 214 in accordance with the positions of the control signals.

In some embodiments, the positions in the position database 236 can correspond to control signals to control the state (e.g., the "on" or "off" state) of the inverters 212 and/or 214. The on state can be a state in which the inverter is powered on, and the off state can be a state in which an inverter is powered off. Such states can correspond to whether the position causes power to be directed to the different inverters. For example, the second position can correspond to an on state of the inverter 212 and an off state of the inverter 214. The second position may do so because the second position causes power from the solar module groups 206 and 208 to be directed to the inverter 212 and not to the inverter 214. The first position can correspond to an on state for both of the inverters 212 and 214. The first position can do so because, in the first state, the solar module group 206 can be connected and providing power to the inverter 212 and the solar module group 208 can be connected and providing power to the inverter 214. The third position can correspond to an off state of the inverter 212 and an on state of the inverter 214. The third position may do so because the third position causes power from the solar module groups 206 and 208 to be directed to the inverter 214 and not to the inverter 212. The controller 234 can send control signals to the inverters 212 and/or 214 in accordance with the states of the selected positions. By doing so, the controller 234 can shut off the one or both of the inverters 212 and 214 that are not being used to convert power from DC power to AC power, thus minimizing no-load losses of the inverters 212 or 214.

In one example, the controller 234 can transmit a signal to the switching system 210 to cause the switching system 210 to be in the second state. The switching system 210 can change the position of the switches within the switching system 210 from the first position to the second position to cause the switches within the switching system 210 to cause both solar module groups 206 and 208 to be connected with the inverter 212 and not be connected with the inverter 214. The control signal can cause the solar module groups 208 to disconnect from the inverter 214. The controller 234 can also transmit a control signal to the inverters 212 and/or 214 (e.g., separate control signals to the inverters 212 and/or 214) to cause the inverter 212 to be powered on and the inverter 214 to be powered off.

In one example, the controller 234 can transmit a signal to the switching system 210 to be in the third position (e.g., the position in which the solar module group 206 and the solar module group 208 are each connected and providing power to the inverter 214 and not the inverter 212). For instance, the switching system 210 can be in the first position (e.g., the position in which the solar module group 206 is connected and providing power to the inverter 212 and not the inverter 214 and the solar module group 208 is connected and providing power to the inverter 214 and not the inverter 212). The event detector 230 can detect an event responsive to determining the combined output of the solar module group 206 and the solar module group 208 is below a threshold percentage of the maximum output of the inverter 212 or the inverter 214. The event detector 230 can retrieve the history of positions of the switching system 210 from the memory 226, in some cases responsive to determining the combined output is below the threshold percentage. Based on the retrieved history, the event detector 230 can determine the position of the switching system 210 immediately before (or a defined position before, such as in cases that include more than three possible positions for the switching system 210) the first position was the second position (e.g., the position in which the solar module group 206 and the solar module group 208 are each connected and providing power to the inverter 212). Responsive to the determination, the event detector 230 can determine the position of the switching system 210 to be the third position. The position selector 232 can retrieve the position data related to the third position from the position database 236. The controller 234 can adjust the position of the switching system 210 to the third position by transmitting a control signal to the switching system 210 including the retrieved position data. In doing so, the controller 234 can disconnect the solar module group 206 from the inverter 212 and connect the solar module group 206 with the inverter 214. The controller 234 can also transmit a signal to the inverter 212 to change the state of the inverter 212 to an off state. The controller 234 may not transmit a control signal to the inverter 214 to change the state of the inverter 214 to the on state because the controller 234 may identify that the inverter 214 was already in the on state from the history of the position data of the switching system 210 indicating the switching system 210 was in the first position (e.g., a position in which the inverter 214 was already in the on state). The position selector 232 can transmit control signals to inverters to turn the inverters on or off upon changing the position of the switching system 210 such that any inverters that were previously off and that are now connected with at least one solar module group are on in the new position of the switching system 210 and any inverters that were previously on and that are now disconnected from any solar module groups are turned off After adjusting the position of the switching system 210 to the third position, the controller 234 can transmit a signal to the switching system 210 to change the switching system 210 back into the first position. For instance, the event detector 230 can detect an event responsive to determining the combined output of the solar module group 206 and the solar module group 208 is below the threshold percentage of the maximum output of the inverter 212 or the inverter 214. Responsive to the determination, the event detector 230 can determine the position of the switching system 210 to be the first position. The position selector 232 can retrieve the position data related to the first position from the position database 236. The controller 234 can adjust the position of the switching system 210 to the first position by transmitting a control signal to the switching system 210 including the retrieved position data. In doing so, the controller 234 can connect the solar module group 206 with the inverter 212 and connect the solar module group 208 with the inverter 214. The controller 234 can also transmit a signal to the inverter 212 to change the state of the inverter 212 to an on state. The controller 234 may not transmit a control signal to the inverter 214 to change the state of the inverter 214 to the on state because the controller 234 may identify that the inverter 214 was already in the on state from the history of the position data of the switching system 210 indicating the switching system 210 was in the third position (e.g., a position in which the inverter 214 was already in the on state).

After adjusting the position of the switching system 210 to the first position, the controller 234 can transmit a signal to the switching system 210 to change the switching system 210 back into the second position. For instance, the switching system 210 can be in the first position. The event detector 230 can detect an event responsive to determining the combined output of the solar module group 206 and the solar module group 208 is below the threshold percentage of the maximum output of the inverter 212 or the inverter 214. The event detector 230 can retrieve the history of positions of the switching system 210 from the memory 226, in some cases responsive to determining the combined output is below the threshold percentage. Based on the retrieved history, the event detector 230 can determine the position of the switching system 210 immediately before the first position was the third. Responsive to the determination, the event detector 230 can determine the position of the switching system 210 to be the second position. The position selector 232 can retrieve the position data related to the second position from the position database 236. The controller 234 can adjust the position of the switching system 210 to the second position by transmitting a control signal to the switching system 210 including the retrieved position data. In doing so, the controller 234 can disconnect the solar module group 208 from the inverter 214 and connect the solar module group 208 with the inverter 212. The controller 234 can also transmit a signal to the inverter 214 to change the state of the inverter 214 to an off state. The controller 234 may not transmit a control signal to the inverter 212 to change the state of the inverter 212 to the on state because the controller 234 may identify that the inverter 212 was already in the on state from the history of the position data of the switching system 210 indicating the switching system 210 was in the first position (e.g., a position in which the inverter 212 was already in the on state).

In one example, the controller 234 can adjust the position of the switching system 210 between the second position and the third position. For instance, the event detector 230 can detect an event based on the switching system 210 being in the second position for a time above a threshold. Accordingly, the position selector 232 can retrieve position data for the third position from the position database 236. The controller 234 can transmit a control signal containing the position data to the switching system 210 to cause the switching system 210 to be in the third position. The controller 234 can similarly adjust the position of the switching system 210 to the second position from the third position responsive to the event detector 230 determining the switching system remained in the third position for an amount of a threshold (e.g., the same threshold as was used to determine to switch from the second position to the third position or a different threshold).

In some embodiments, the system 200 can include more than two solar module groups. For example, the system 200 can include the solar module group 206, the solar module group 208, and a third solar module group comprising one or more solar modules. The third solar module group can be connected to the inverters 212 and/or 214 through the switching system 210 in a first position, a second position, and/or a third position. In the first position, the switching system 210 can connect the solar module group 206 and the third solar module group with the inverter 212, and the solar module group 208 with the inverter 214. In the second position, the switching system 210 can connect the solar module group 206, the solar module group 208, and the third solar module group with the inverter 212. In the third position, the switching system 210 can connect the solar module group 206 with the inverter 212, the solar module group 208 with the inverter 214, and the third solar module group with the inverter 214.

The energy manager 204 can adjust the position of the switching system 210 between positions with three solar module groups in a similar manner to how the energy manager 204 can adjust the position of the switching system 210 with two solar module groups. For example, the energy manager 204 can adjust the position of the switching system 210 to the first position when the combined output power of the three solar module groups is above a first threshold percentage of the maximum output of the inverter 212 or the inverter 214 and below a second threshold percentage of the maximum output of the inverter 212 or the inverter 214. The energy manager 204 can adjust the position of the switching system to the second position responsive to determining the combined output power of the three solar module groups is below the first threshold percentage. The energy manager 204 can adjust the position of the switching system to the third position responsive to determining the combined output power of the three solar module groups is above the second threshold percentage of the maximum output of the inverter 212 or the inverter 214. The first and second positions can be the same as or correspond to the first and second positions described above with respect to the embodiment in which there are only two solar module groups.

There can be more than three positions of the switching system 210 when the switching system 210 connects three solar module groups with two inverters (e.g., the inverters 212 and 214). For example, in the first position, all three solar module groups can be connected to the inverter 212. In the second position, the solar module group 206 can be connected to the inverter 214, and the other two solar module groups can be connected to the inverter 212. In the third position, the solar module group 208 can be connected to the inverter 214 and the other two solar module groups can be connected to the inverter 212. In a fourth position, the third solar module connected to the inverter 214 and the other two solar module groups can be connected to the inverter 212. In a fifth position, the solar module groups 206 and 208 can be connected to the inverter 214 and third solar module group can be connected to the inverter 212. In a sixth position, the solar module group 206 and the third solar module group can be connected to the inverter 214 and the second solar module group can be connected to the inverter 212. In a seventh position, the solar module group 208 and the third module group can be connected to the inverter 214 and the first solar module group can be connected to the inverter 212. In an eighth position, all three solar module groups can be connected to the inverter 214. The second, third, and fourth position can be essentially equivalent (e.g., the same number of solar module groups are connected to the same number of inverters). The fifth, sixth, and seventh positions can be essentially equivalent. The first position and the eight position can be essentially equivalent.

The threshold percentage that the energy manager 204 uses to select positions for the switching system 210 can vary or be based on the number of solar module groups that are configured to couple with the inverters 212 and 214. For example, if there are more solar module groups, there are more positions or configurations of connections between the solar module groups and the inverters 212 and 214. Each solar module group can additionally provide more power to the inverters 212 and 214. Accordingly, the threshold percentage can be lower the more solar module groups that are connected with the inverters 212 and 214.

In some cases, the number of threshold percentages that the energy manager 204 uses can vary based on the number of solar module groups that are configured to couple with the inverters 212 and 214. For example, in some embodiments, the more solar module groups, the more threshold percentages the switching system 210 can use to select positions for the switching system 210. The threshold percentage can be a lowest threshold percentage and vary based on the number of solar module groups configured to connect with the inverters 212 and 214.

In some embodiments, the system 200 can include more than two solar module groups and more than two inverters. For example, the system 200 can include the solar module group 206, the solar module group 208, a third solar module group comprising one or more solar modules, the inverter 212, the inverter 214, and a third inverter. The third inverter can have the same or a different maximum output or power capacity as the inverter 212 and the inverter 214. The solar module group 206, the solar module group 208, and/or the third solar module group can connect with the inverter 212, the inverter 214, and/or the third inverter through the switching system 210 in a first position, a second position, and/or a third position. In the first position, the switching system 210 can connect the solar module group 206 and the third solar module group with the inverter 212 and the solar module group 208 with the inverter 214. In the second position, the switching system 210 can connect the solar module group 206, the solar module group 208, and the third solar module group with the inverter 212. In the third position, the switching system 210 can connect the solar module group 206 with the inverter 212, the solar module group 208 with the inverter 214, and the third solar module group with the third inverter.

There can be more than three positions of the switching system 210 when the switching system 210 connects three solar module groups (e.g., the solar module groups 206 and 208 and the third solar module group) with three inverters (e.g., the inverters 212 and 214). For example, there can be 27 possible positions (e.g., configurations) of the switching system 210 when there are three solar module groups and three inverters. The solar module group 206 can connect to any of the three inverters. For each of the connection of the first solar group module group 208 can connect to any of the three inverters. For each of the connections of the first and second solar groups, the third solar module group can connect to any of the three inverters. Thus, the switching system 210 can have 3×3×3 positions (i.e., 27 possible positions). Many of the positions can be essentially equivalent to each other.

The number of positions of the switching system 210 can vary based on the number of solar module groups and the number of inverters that are connected with the switching system 210. For instance, each variation in number of solar module groups and inverters can correspond to a number of positions in which each solar module group can connect with each inverter. Accordingly, the more solar module groups and/or inverters, the more possible positions of the switching system 210.

The energy manager 204 can adjust the position of the switching system 210 between positions with three solar module groups and three inverters in a similar manner to how the energy manager 204 can adjust the position of the switching system 210 with two solar module groups and two inverters. For example, the energy manager 204 can adjust the position of the switching system 210 to the first position responsive to determining the combined output power of the three solar module groups is above a first threshold percentage of the maximum output of the inverter 212, 214, or the third inverter and below a second threshold percentage of the maximum output of the inverter 212, the inverter 214, or the third inverter. The energy manager 204 can adjust the position of the switching system to the second position responsive to determining the combined output power of the three solar module groups is below the first threshold percentage. The energy manager 204 can adjust the position of the switching system to the third position responsive to determining the combined output power of the three solar module groups is above the second threshold percentage of the maximum output the inverter 212, the inverter 214, or the third inverter. The first and second positions can be the same as or correspond to the first and second positions described above with respect to the embodiment in which there are only two solar module groups.

The energy manager 204 can store threshold percentage schedules in the memory 226. The threshold percentage schedules can correspond to the number of solar module groups and/or the number of inverters that are connected through the switching system. The threshold percentage schedules can each include one or more thresholds (e.g., criteria) and/or positions of the switching system 210 that correspond to the combined output of the solar module groups into the switching system 210 and to the inverters. The energy manager 204 can select which schedule to use to select the position and control the switching system 210 accordingly based on a user input or by detecting (e.g., by monitoring the inputs of the switching system 210 or the number of network connections the energy manager 204 has with energy meters and/or inverters) the number of inverters and/or solar module groups in the system 200 connected through the switching system 210.

In some embodiments, the energy manager 204 can select the positions of the switching system 210 based on the power capacities of the inverters connected with the switching system 210. For example, the system 200 can include at least the solar module group 206, the solar module group 208, the inverter 212, the inverter 214, and a third inverter. The inverter 212 can have a lower capacity than each of the inverter 214 and the third inverter. The system 200 can include any number of solar module groups and/or inverters. The energy manager 204 can select a schedule for controlling the switching system 210 from memory based on the number of solar module groups and inverters that are connected through the switching system 210. The schedule can include multiple threshold percentages of the maximum output of any one of the inverters of the system 200. The energy manager 204 can determine the combined power output of the solar module groups of the system 200 is below a lowest threshold percentage of the schedule. The lowest threshold percentage can be 1%, for example. Each threshold percentage of the schedule can be an increment of 1% from the lowest threshold percentage, for example. Responsive to the determination, the energy manager 204 can select a position that causes the solar module groups of the system 200 to connect with the inverter with the lowest capacity (e.g., the inverter 212) and/or disconnect from the other inverters of the system 200. The energy manager 204 can turn off the other inverters of the system 200. By doing so, the energy manager 204 can operate the inverter 212 at the highest efficiency and reduce the no-load losses of the other inverters.

In operation, the solar module groups 206 and 208 and the inverters 212 and 214 can be positioned to minimize the length of the lines connecting the components within the system 200. For example, the solar module group 206 and the inverter 212 can be located on or at a first side of the switching system 210. The solar module group 208 and the inverter 214 can be located on or at a second side of the switching system 210 opposite the first side of the switching system 210 as viewed from above. In another example, the system 200 can include a third solar module group, a fourth solar module group, a third inverter, and a fourth inverter. The third solar module group and the fourth solar module group can each include one or more solar modules. The third solar module group and the third inverter can be located on the first side of the switching system 210. The solar module group 206 and the third solar module group can be connected with the inverter 212 and/or the third inverter through the switching system 210. The fourth solar module group and the further inverter can be located on the second side of the switching system 210 opposite the first side of the switching system 210. The solar module group 208 and the fourth solar module group can be connected with the inverter 214 and the fourth inverter.

In some embodiments, in addition to or instead of using a physical switching system, such as the switching system 210, the energy manager 204 can control the energy draw of the inverters 212 and 214 (and any other inverters of the renewable energy system) by operating the inverters 212 and 214 in different control positions. The control positions can each define or indicate which inverters draw power or energy from which solar module group. For example, the energy manager 204 can operate the inverters 212 and 214 in multiple different control positions. In a first control position, the energy manager 204 can transmit one or more control signals to the inverters 212 and/or 214 to cause the inverter 212 to draw energy from the solar module group 206 and the inverter 214 to draw energy from the solar module group 208. The energy manager 204 can operate the inverters 212 and 214 in the first control position in response to determining a combined output of the solar module group 206 and the solar module group 208 exceeds a threshold (e.g., the same or a similar threshold to the threshold described above, such as 50% of the maximum power output of the inverter 212 or the inverter 214). In a second control position, the energy manager 204 can transmit one or more control signals to the inverters 212 and/or 214 to cause the inverter 212 to draw energy from the solar module group 206 and the solar module group 208 and the inverter 214 to not draw (e.g., stop drawing) energy from either solar module group. The energy manager 204 can operate the inverters 212 and 214 in the second control position in response to determining the combined output of the solar module group 206 and the solar module group 208 is less than the threshold. In a third control position, the energy manager 204 can transmit one or more control signals to the inverters 212 and/or 214 to cause the inverter 214 to draw energy from the solar module group 206 and the solar module group 208 and the inverter 212 to not draw (e.g., stop drawing) energy from either solar module group. The energy manager 204 can operate the inverters 212 and 214 in the third control position in response to determining the combined output of the solar module group 206 and the solar module group 208 is less than the threshold and/or in response to determining the energy manager 204 operated the inverters 212 and 214 in the second control position immediately prior to operating the inverters 212 and 214 in the first control position from which the energy manager 204 is changing the inverters 212 and 214 to the third control position. The energy manager 204 can operate inverters in this way for any number of inverters and/or solar module groups connected to such inverters. In doing so, the energy manager 204 can cause the inverters draw energy from any permutation of the solar module groups.

When operating the inverters 212 and 214 using different control positions, the inverters 212 and 214 can be coupled or connected (e.g., directly coupled or connected) with the solar module groups 206 and 208. Accordingly, the energy manager 204 can control which inverters receive energy from which solar module group by controlling the inverters 212 and 214 and without changing a position of or transmitting signals to a physical switching system (e.g., the physical switching system 210), such as a physical switching external to the inverters 212 and 214. However, in some cases, the energy manager 204 can transmit control signals to the different inverters 212 and 214 in tandem with control signals to the switching system 210. Doing so, can cause the inverters 212 and 214 that are connected to the respective solar module groups 206 and 208 through the switching system 210 to draw energy from the connected solar module groups 206 and 208.

The descriptions herein regarding the different positions of the switching system 210 can also apply to the control positions of the inverters 212 and 214. For example, the energy manager 204 can control the energy draw of individual inverters 212 and 214 (and any other inverters of the system 200) using the same rules and/or criteria, such as based on whether the combined output of the solar module groups 206 and 208 exceeds or is less than a threshold (e.g., 50% of the maximum power output of the inverter 212 or the inverter 214). The energy manager 204 can control the energy draw of any number of inverters and from any number solar module groups in any number of control positions in a similar manner to the manner described above with respect to controlling the position of the switching system 210. In doing so, the energy manager 204 may transmit control signals to inverters to turn on and/or draw energy from different solar module groups in different control positions based on one or more thresholds of a schedule. The energy manager 204 can transmit control signals to the inverters that are not drawing energy from the different solar module groups to turn the inverters "off" to reduce any no-load losses of such inverters.

Figure 3A:
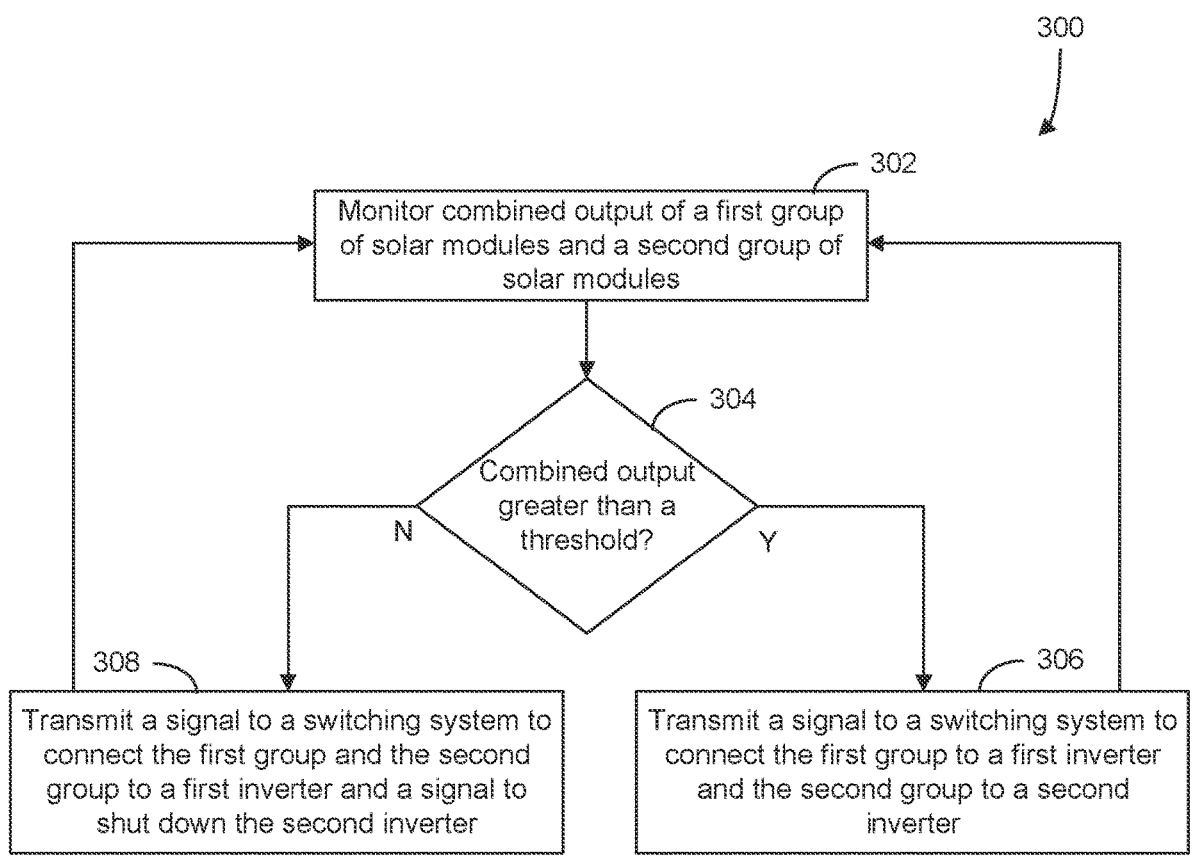
FIG. 3A illustrates a flowchart of an example method for controlling the output of solar module groups between inverters, according to some embodiments.

FIG. 3A illustrates a method 300 (e.g., a process) for controlling the load placed on inverters from outputs of solar module groups, according to some embodiments. The method 300 can be performed by a data processing system (e.g., a controller, the RES–ESS dispatcher unit 36, the ESS controller 22, the RES SCADA controller 12, the computing device 800, the energy manager 204, etc.). In some embodiments, the data processing system is the controller of a renewable energy plant that contains one or more arrays or groups of solar modules that charge a load (e.g., a BESS of the renewable energy plant) or the energy grid (e.g., a utility grid operated by an external entity). The data processing system may control a switching system within the renewable energy plant that connects the solar module groups with inverters for converting the DC power output of the solar module groups into AC power output. The data processing system can control the switching system to vary the connections between the solar module groups and the inverters such that the inverters operate more efficiently (e.g., operate at, or close to, capacity for optimized efficiency). The data processing system can control the switching system over time as the data processing system receives measurements regarding the power output of the solar module groups. In this way, the data processing system can control which solar module group is providing power to which inverter in real-time to vary the amount of power each inverter is receiving for efficient operation. The method 300 may include more or fewer operations and the operations may be performed in any order.

At operation 302, the data processing system monitors the output of a first solar module group and a second solar module group. The data processing system can monitor the output by polling or otherwise receiving measurements of power output by the first and second groups of solar modules from energy meters coupled with the groups of solar modules. The data processing system can determine the combined output of the first solar module group and the second solar module group by aggregating the measurements that the data processing system receives or retrieves from the energy meters. The data processing system may identify the most recently received measurements (e.g., the measurements that correspond with the most recent timestamps in memory) and aggregate the measurements together to determine the combined power output of the first solar module group and the second solar module group. The data processing system may continuously determine the combined power output of the first solar module group and the second solar module group over time.

At operation 304, the data processing system determines whether the combined power output is greater than a threshold. The threshold can be a percentage threshold of the maximum capacity (e.g., a value at which the inverter operates at its highest efficiency or the highest power that the inverter can output) of a first inverter or a second inverter. The threshold percentage can be 50%, for example. The first inverter and/or the second inverter can be configured to couple with the first solar module group and/or the second solar module group through a switching system. The data processing system can compare the combined power output with the threshold. Responsive to determining the combined output is at least at the percentage threshold, at operation 306, the data processing system signals (e.g., transmits a message or control signal to) the switching system to connect the first solar module group to the first inverter and the second solar module group to the second inverter.

Responsive to determining that the combined output of the first solar module group and the second solar module group is less than the threshold percentage, at operation 308, the data processing system signals the switching system to connect the first solar module group and the second solar module group to the first inverter. The data processing system can additionally or instead signal the second inverter to shut down the second inverter. The data processing system can repeat operations 302-308 over time switching between different configurations of the switching system to control which solar module groups are connected to which inverters.

Performing the systems and methods described herein can change the manner in which groups of solar modules are connected to inverters (e.g., solar inverters). Instead of each solar module group being associated with only a single inverter, at least some groups of solar modules may be connected to any one of two or more inverters through a physical or electronic switch.

For example, the system can include two groups of solar modules, two inverters, and a switching arrangement (e.g., a switching system) that allows one solar module group (e.g., a second solar module group) to be connected to either inverter. The other solar module group (e.g., the first solar module group) can be hardwired to only one of the inverters. When the electrical output (e.g., the combined electrical output) of the solar module groups is high enough, the first solar module group can drive a first inverter to, or close to, the first inverter's maximum output power. The second solar module group can be connected by the switching system to drive a second inverter to, or close to, the second inverter's maximum output power. With the two inverters operating at or close to their maximum output powers, both inverters can operate at high efficiency.

When the output of each solar module group can drive each inverter to 50% or less of the respective inverter's maximum output power, the switching system can connect the second solar module group to the first solar module group. In this configuration, both solar module groups can drive the first inverter. If the output of each individual solar module group would be enough to drive each inverter to 50% of its maximum output power, the output of both solar module groups can be enough to drive a single inverter up to its maximum output power of the inverter. Because the inverters can be more efficient at high output powers, a single inverter operating at full power can be more efficient (e.g., lose less energy) than two inverters driven at 50% power. In this case, the second inverter can be shut down entirely, thus eliminating the second inverter's no-load loss.

In the aforementioned configuration, the first inverter may always receive power, while the second inverter may only receive power when the output of both solar module groups would be more than enough to drive the first inverter to the first inverter's maximum output power. Because of this asymmetry, the first inverter may experience more "wear and tear" than the second inverter over a period of time. The wear and tear could be equalized between the inverters by arranging the switching system so that either solar module group can be connected to either inverter and alternating between which inverter receives power from both solar module group during reduced-power operations.

Figure 3B:
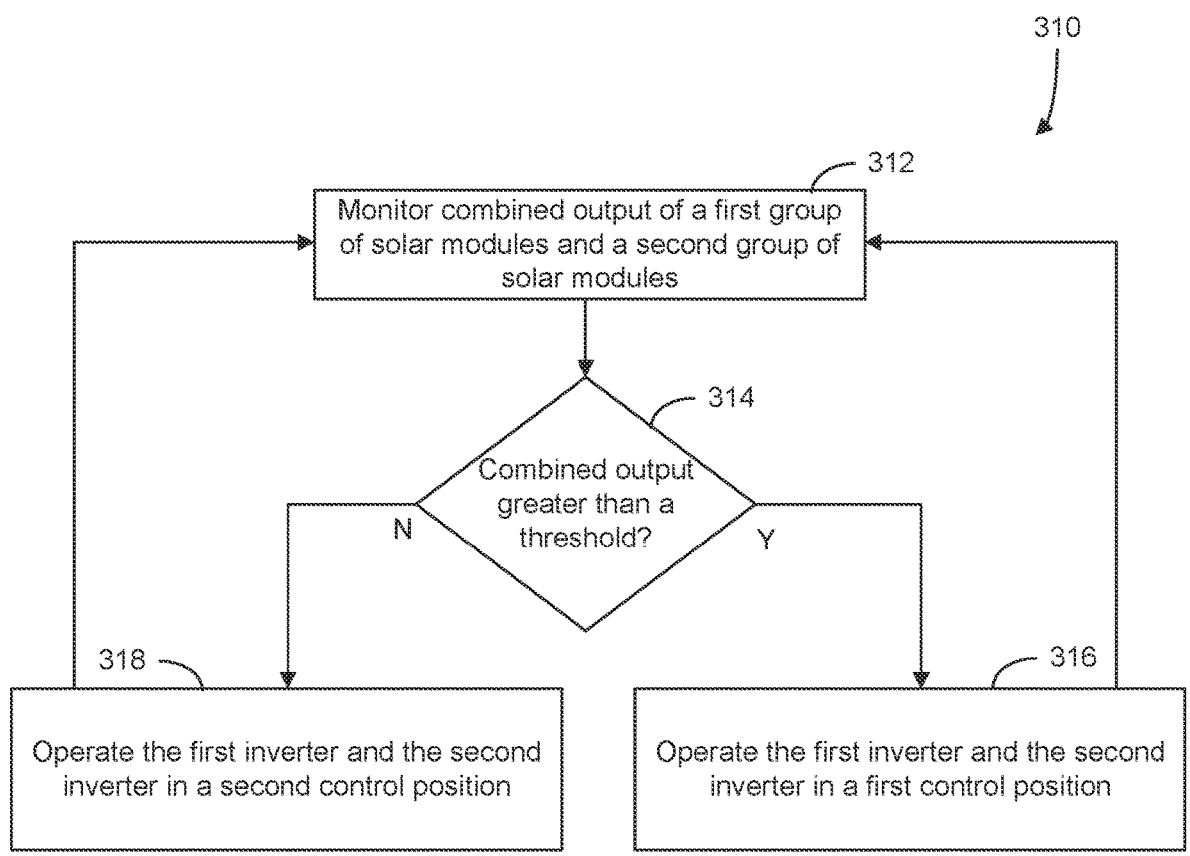
FIG. 3B illustrates a flowchart of an example method for controlling the output of solar module groups between inverters, according to some embodiments.

FIG. 3B illustrates a method 310 (e.g., a process) for controlling the load placed on inverters from outputs of solar module groups, according to some embodiments. The method 310 can be performed by a data processing system (e.g., a controller, the RES–ESS dispatcher unit 36, the ESS controller 22, the RES SCADA controller 12, the computing device 800, the energy manager 204, etc.). In some embodiments, the data processing system can perform the method 310 concurrently with the method 300. In some embodiments, the data processing system is the controller of a renewable energy plant that contains one or more arrays or groups of solar modules that charge a load (e.g., a BESS of the renewable energy plant) or the energy grid (e.g., a utility grid operated by an external entity). The data processing system may operate inverters of the renewable energy plant coupled or connected with the groups of solar modules. The data processing system may operate the different inverters by transmitting signals (e.g., control signals) to the inverters (e.g., the inverters of the renewable energy plant that are coupled or connected with solar module groups of the renewable energy plant) to cause the inverters to be in different control positions. Each control position can correspond to one or more defined inverters of the renewable energy plant drawing power or energy from defined one or more solar module groups of the renewable energy plant. The data processing system can operate the inverters in different control positions based on the amount of power the solar module groups are generating similar to the method described with reference to FIG. 3A. The data processing system can operate the inverters by transmitting control signals to the inverters that cause the inverters to draw energy from specific solar module groups and, in some cases, not other solar module groups (e.g., such as by changing the positions of switches internal or inside a housing of the inverters that connect the inverters to the different solar module groups). The data processing system can change the control positions of the inverters over time to optimize the efficiency of the inverters (e.g., maximize the amount of energy the individual inverters receive while turning other inverters off). The data processing system can control the control positions of the inverters over time as the data processing system receives measurements regarding the power output of the solar module groups. In this way, the data processing system can control which solar module group is providing power to which inverter in real-time to vary the amount of power each inverter is receiving for efficient operation. The method 310 may include more or fewer operations and the operations may be performed in any order.

At operation 312, the data processing system monitors the output of a first solar module group and a second solar module group. The data processing system can monitor the output by polling or otherwise receiving measurements of power or energy output by the first and second groups of solar modules from energy meters coupled with the groups of solar modules. The data processing system can perform the operation 312 in the same or a similar manner to the manner described above with respect to the operation 302.

At operation 314, the data processing system determines whether the combined power output is greater than a threshold. The threshold can be a percentage threshold of the maximum capacity (e.g., a value at which the inverter operates at its highest efficiency or the highest power that the inverter can output) of a first inverter or a second inverter. The threshold percentage can be 50%, for example. The data processing system can perform the operation 314 in the same or a similar manner to the manner described above with respect to the operation 304.

Responsive to determining the combined output is at least at the percentage threshold, at operation 316, the data processing system operates the first inverter and the second inverter in a first control position. The data processing system can operate the first inverter and the second inverter in the first control position, for example, by transmitting one or more signals (e.g., control signals) to the inverters to cause the first inverter to draw energy from the first solar module group and the second inverter to draw energy the second solar module group. The control signals can cause the inverters to not draw energy from the other solar module group (e.g., the first inverter may only draw energy from the first solar module group and the second inverter may only draw energy from the second solar module group). The data processing system may do so when the combined power output exceeds the threshold to ensure the output power from the first and second solar module groups can go through the respective inverters without clipping any of the energy the solar module groups create.

However, responsive to determining that the combined output of the first solar module group and the second solar module group is less than the threshold percentage, at operation 318, the data processing system operates the first inverter and the second inverter in a second control position. The data processing system can operate the first inverter and the second inverter in the second control position, for example, by transmitting one or more signals (e.g., control signals) to the inverters to cause the first inverter to draw energy from both the first solar module group and the second solar module group and the second inverter to not (e.g., to stop) draw energy from any solar module groups. The data processing system can additionally or instead signal the second inverter to shut down the second inverter. The data processing system may do so when the combined power output is less than the threshold to optimize the efficiency of the first inverter to maximize the energy that the first inverter inverts from DC to AC and to reduce the no-load losses of the second inverter The data processing system can repeat operations 312-318 over time switching between different control positions for the inverter to control which inverters draw power or energy from which solar module groups. In doing so, the data processing system can operate an electronic switch that may or may not incorporate the physical switching system described with reference to FIG. 3A.

Performing the systems and methods described herein can change the manner in which groups of solar modules provide energy to inverters (e.g., solar inverters). Instead of each solar module group being associated with only a single inverter, at least some groups of solar modules may be connected to, and/or provide energy to, any one of two or more inverters through a physical or electronic switch.

Figure 4A:
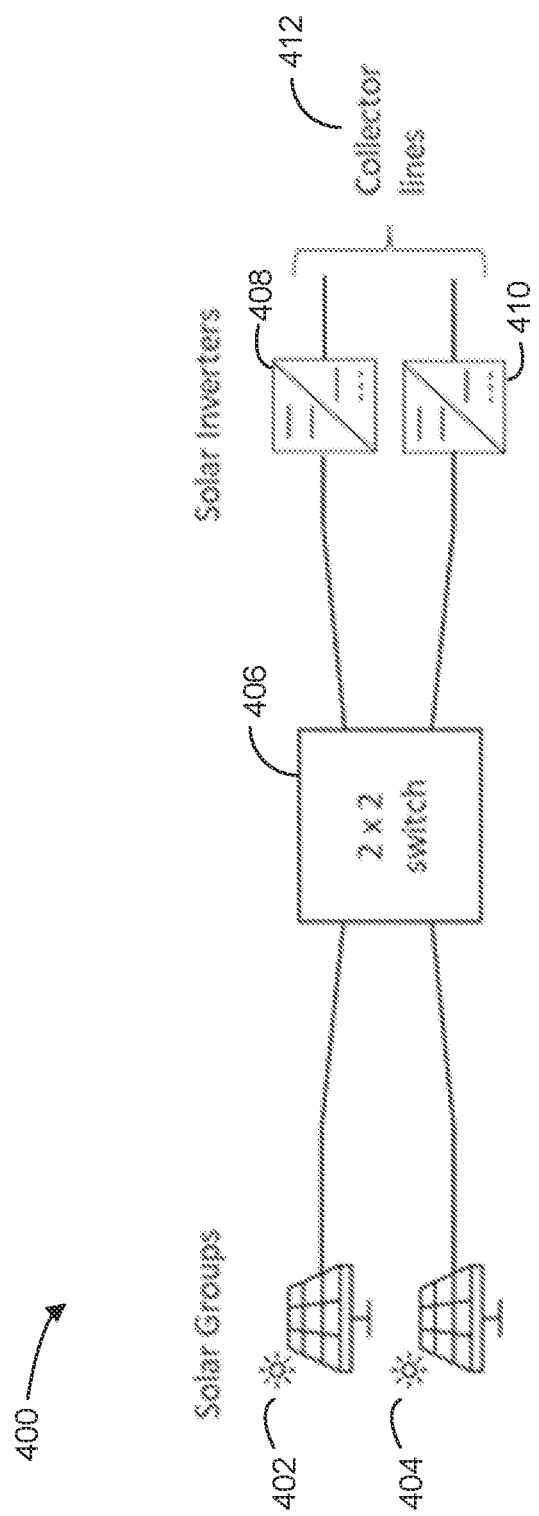
FIG. 4A illustrates a system for switching solar module groups between inverters, according to some embodiments.

For example, FIG. 4A illustrates a system 400 for switching solar module groups between inverters, according to some embodiments. The elements of the system 400 can be the same as or similar to the elements shown and described with reference to FIG. 2. The system 400 can include solar module groups 402 and 404 (e.g., the solar module groups 206 and 208), a switching system 406 (e.g., the switching system 210), inverters 408 and 410 (e.g., the inverters 212 and 214), and collector lines 412. The solar module groups 402 and 404 can be connected with the inverters 408 and 410 through the switching system 406. The solar module groups 402 and 404 can be connected with the inverters 408 and 410. The inverters 408 and 410 can output power or energy to a transformer (e.g., a step-up transformer) connected to a utility grid through collector lines 412. The collector lines 412 can be lines that operate at medium or high voltages (e.g., medium or high AC voltages). The switching system 406 can enable either solar module group 402 or 404 to connect with either inverter 408 or 410. The switching system 406 can be a 2×2 switch. A controller (e.g., the energy manager 204) can control the position or configuration of the switching system 406 to control the connections between the solar module groups 402 and 404 and the inverters 408 and 410.

Figure 4B:
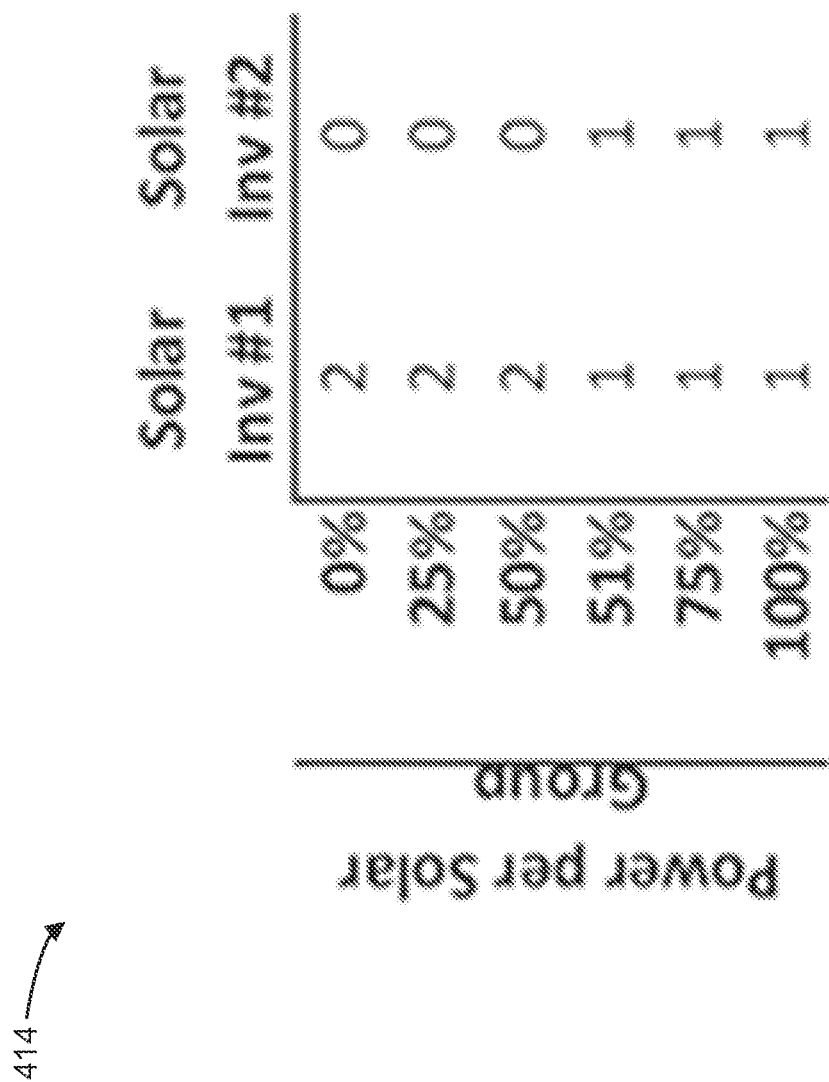
FIG. 4B illustrates a schedule for switching solar module groups between inverters, according to some embodiments.
Figure 4C:
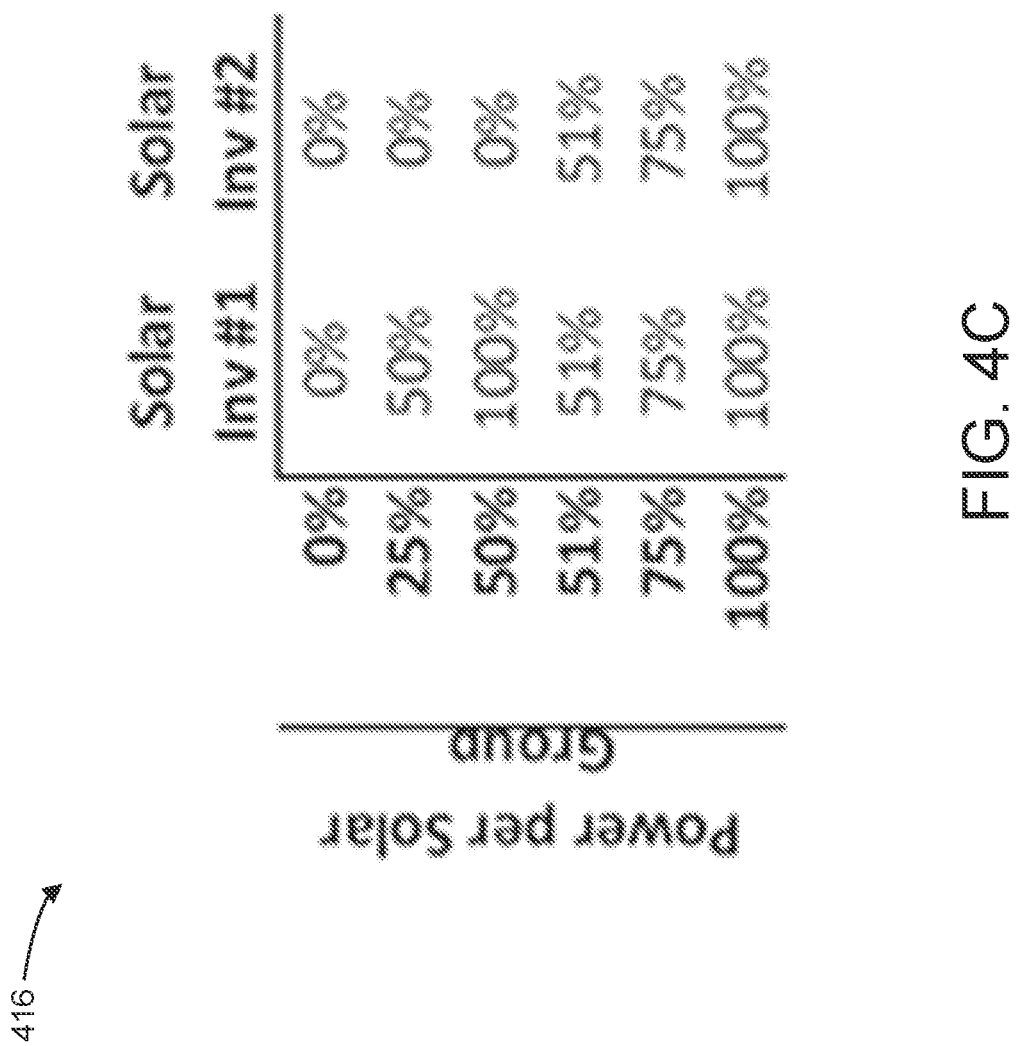
FIG. 4C illustrates a schedule for switching solar module groups between inverters, according to some embodiments.

For example, FIGS. 4B and 4C illustrate schedules 414 and 416 for switching solar module groups between inverters, according to some embodiments. The schedule 414 can indicate the number of solar module groups that are connected with each inverter. The schedule 416 can indicate the amount of power each inverter outputs at different power outputs (e.g., power per solar group) of the solar module groups. The controller can monitor the combined power output of the solar module groups 402 and 404. The controller can determine the percentage of the combined power output of solar module groups 402 and 404 compared with the maximum power output of one of the inverters 408 or 410. The controller can compare the percentage to the schedules 414 and/or 416. Based on the comparison, the controller can identify the position of the switches from the schedule 414 or the schedule 416. The controller can control the switching system 406 and/or the on or off state of the inverters 408 and/or 410 based on the identified position.

In the example schedules 414 and 416, the inverters 408 and 410 can be identical. The power per solar group reference in the schedules 414 and 416 can be the combined amount of power from the solar module groups 402 and 404. The solar module groups can be assumed to be identical and have near-identical instantaneous generating capacity. In one example, at any value of power per solar group up to 50%, both solar module groups 402 and 404 can be connected to a single inverter (e.g., the inverter 408). At any value of power per solar group above 50%, each inverter 408 and 410 can be connected to a single solar module group.

The schedule 416 illustrates the resulting power levels at each inverter 408 and 410, as a percent of their maximum output power. The switching configuration of the switching system 406 can drive the inverter 408 to 100% of the maximum output of the inverter 408, and thus, in some embodiments, to the maximum efficiency of the inverter 408, when the power per solar group of the solar module groups 402 and 404 is at only 50%. Thus, when the power per solar group is below 50%, this system can be more efficient than conventional systems that connect each solar module group to inverters in a fixed configuration. When the power per solar group is above 50%, the system efficiency can be equal to that of a conventional system. When only one of the inverters is operating, the other can be shut down altogether, eliminating the no-load losses of the shut-down inverter.

Figure 5A:
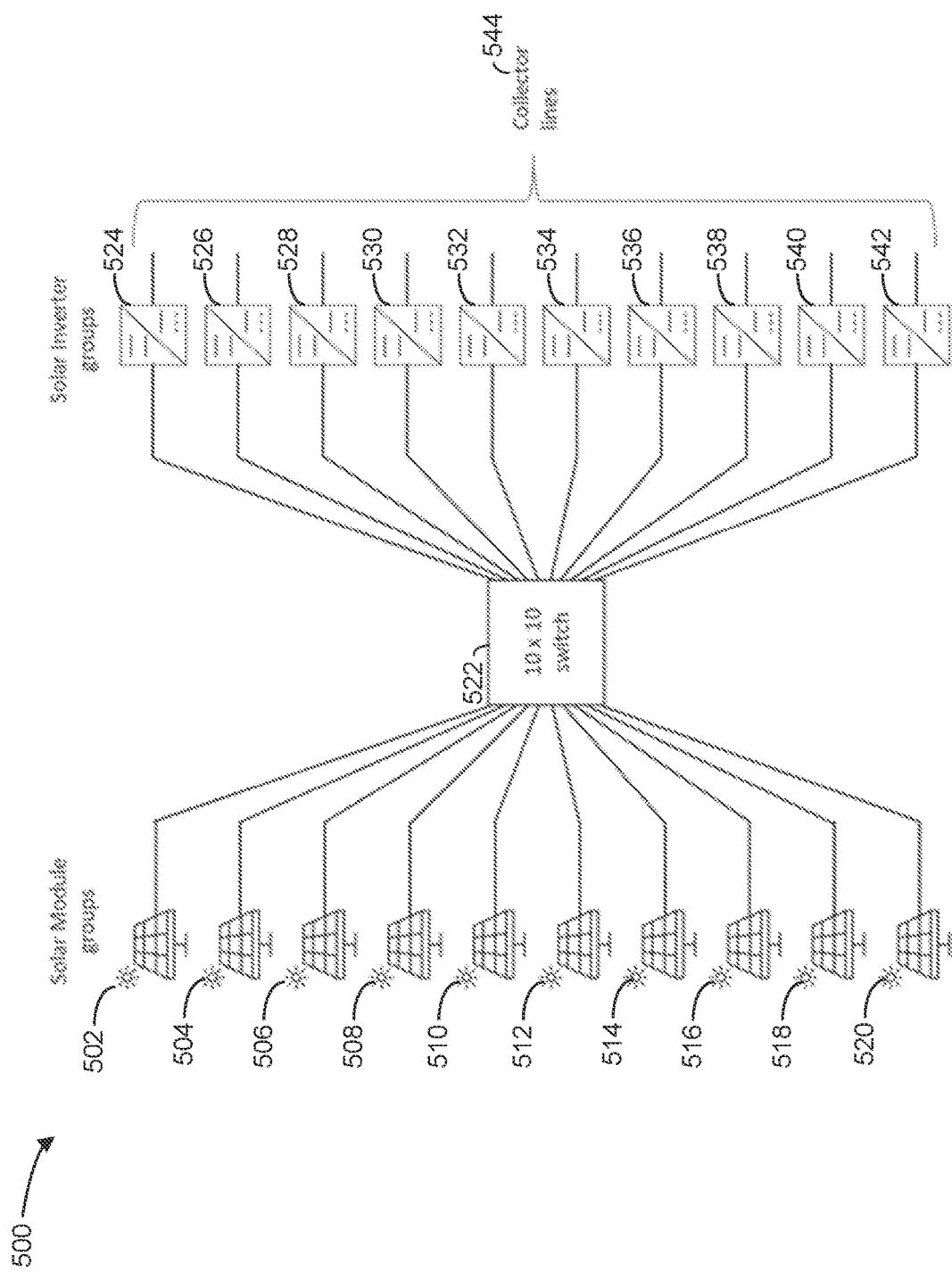
FIG. 5A illustrates a system for switching solar module groups between inverters, according to some embodiments.

FIG. 5A illustrates a system 500 for switching solar module groups between inverters, according to some embodiments. The elements of the system 500 can be the same as or similar to the elements shown and described with reference to FIG. 2. The system 500 can include solar module groups 502-520 (e.g., solar module groups similar to the solar module groups 206 and 208), a switching system 522 (e.g., the switching system 210), inverters 524-542 (e.g., inverters similar to the inverters 212 and 214), and collector lines 544. The solar module groups 502-520 can be connected with the inverters 524-542 through the switching system 522. The solar module groups 502-520 can be connected with the inverters 524-542. The inverters 524-542 can output power or energy to a transformer (e.g., a step-up transformer) connected to a utility grid through collector lines 544. The collector lines 544 can be lines that operate at medium or high voltages (e.g., medium or high AC voltages). The switching system 522 can enable any of the solar module groups 502-520 to connect with any of the inverters 524-542. The switching system 522 can be a 10×10 switch. A controller (e.g., the energy manager 204) can control the position or configuration of the switching system 522 to control the connections between the solar module groups 502-520 and the inverters 524-542.

Figure 5B:
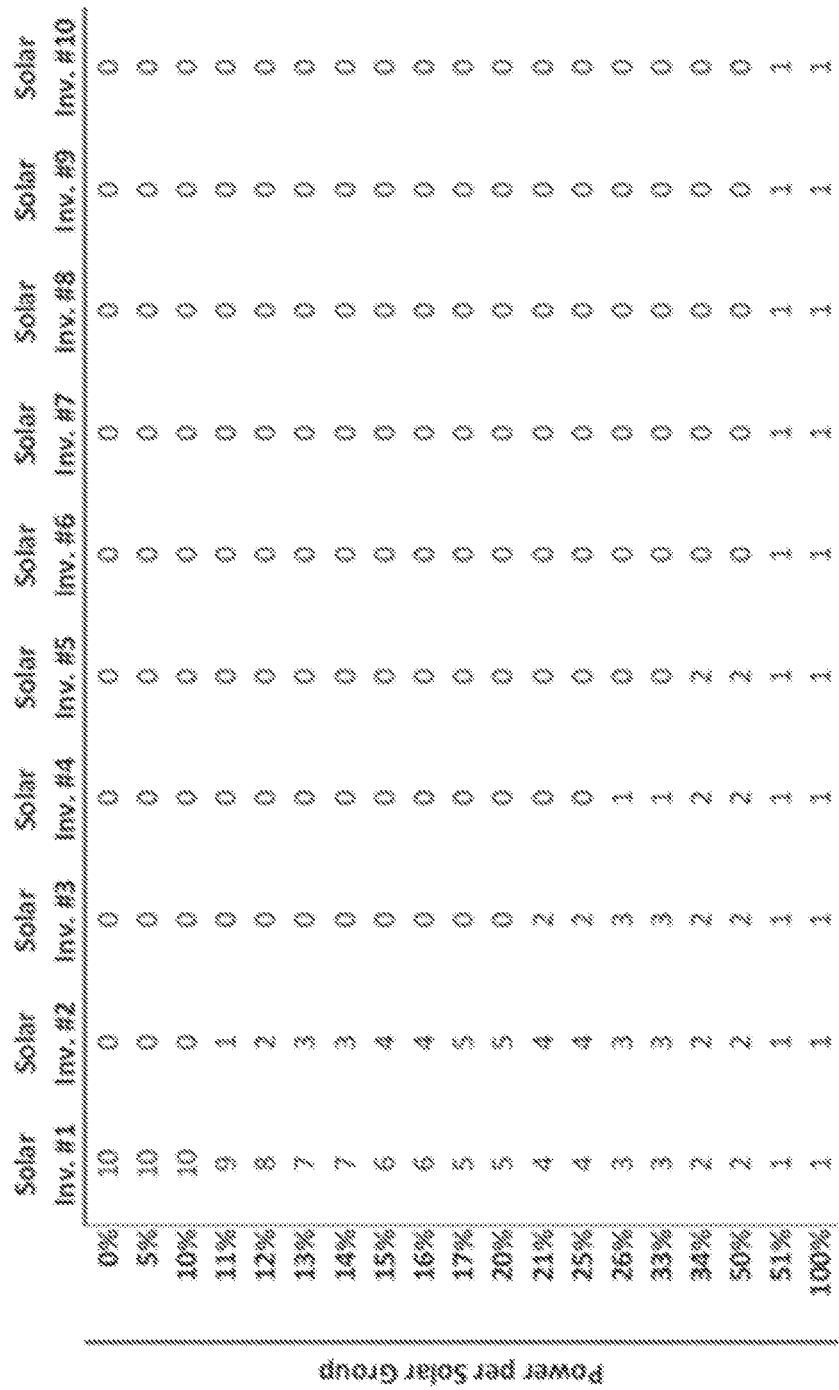
FIG. 5B illustrates a schedule for switching solar module groups between inverters, according to some embodiments.
Figure 5C:
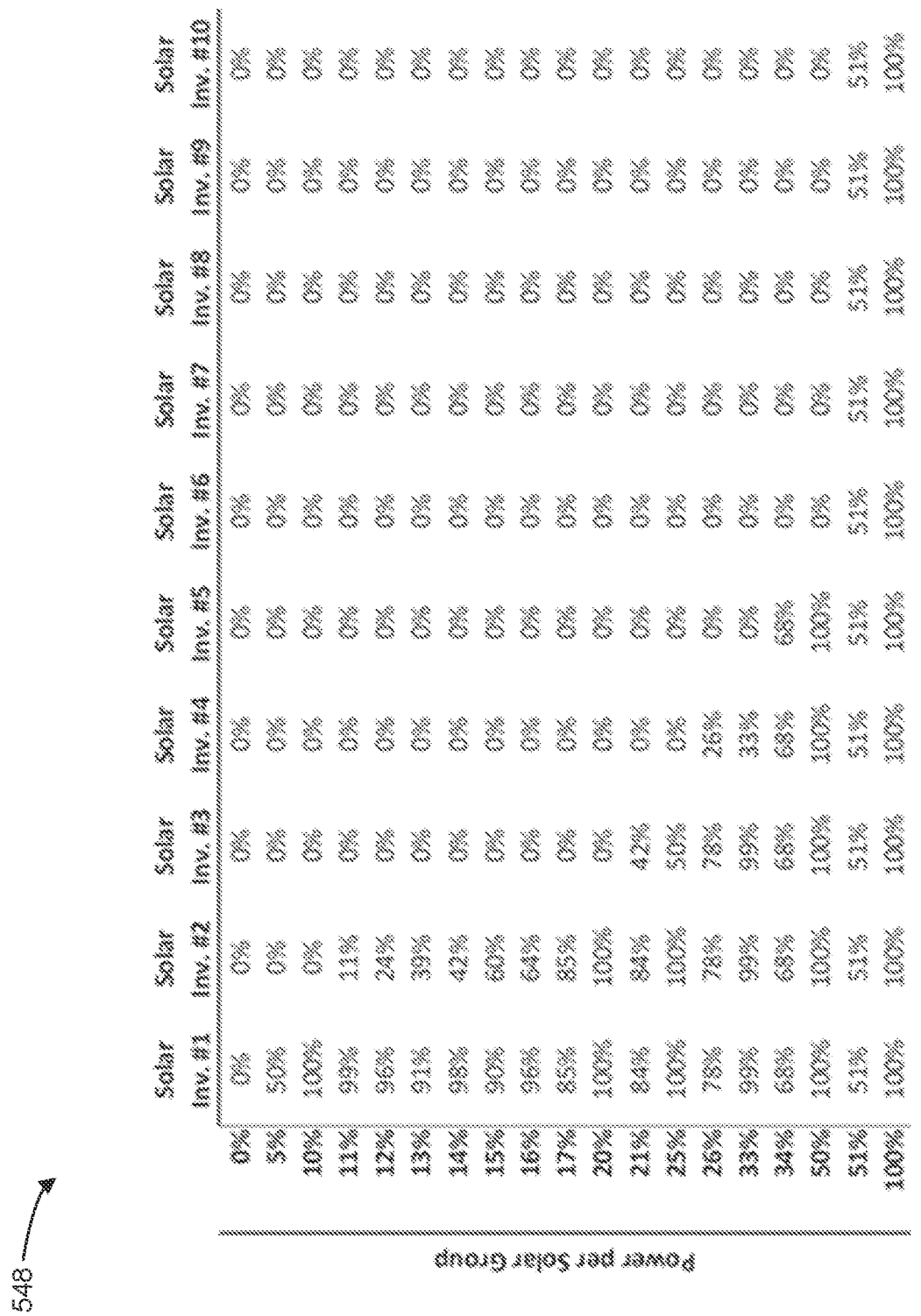
FIG. 5C illustrates a schedule for switching solar module groups between inverters, according to some embodiments.

For example, FIGS. 5B and 5C illustrate schedules 546 and 548 for switching solar module groups between inverters, according to some embodiments. The schedule 546 can indicate how the system 500 can be configured for maximum efficiency at various values of power per solar group. As with the 2×2 configuration, at any value of power per solar group above 50%, the switch configuration of the system 500 can become equivalent to a conventional arrangement, so that each solar module group is connected directly to a single inverter. However, at values of power per solar group up to 10%, ten solar module groups can be connected to a single inverter, while all, or most, of the other inverters can be shut down and their no-load losses eliminated (e.g., substantially eliminated). The number of solar module groups connected to that inverter can be described by the formula Integer(1/{power per solar group (as a percentage)}). As the power per solar group rises, the solar module groups can be switched to connect with more and more of the inverters. As the power per solar group rises above 34%, half of the inverters can receive power, each from two solar module groups. As the power per solar group rises above 50%, all the inverters can receive power, each from a single solar module group.

The schedule 548 illustrates the resulting power levels at each inverter in the 10×10 configuration illustrated in FIG. 5A as a percent of the inverters 524-542 maximum output power. As illustrated in the schedule 548, the switching configuration can drive a Solar Inverter #1 to 100% of its maximum output, and thus, in some embodiments, to the Solar Inverter #1's maximum efficiency, when the power per solar group is at only 10%. At levels of power per solar group between 10% and 50%, the power flowing through any of the active inverters can be equal to or greater than the power that would flow through the respective inverters in a conventional configuration (e.g., a configuration that connects each solar module group to the inverters in a fixed configuration). The power flowing through Solar Inverter #1, in particular, can almost always be well above what it would have been in a conventional configuration. When the power per solar group is above 50%, the power flowing through each inverter and the system efficiency can be equal to that of the conventional configuration.

Figure 6A:
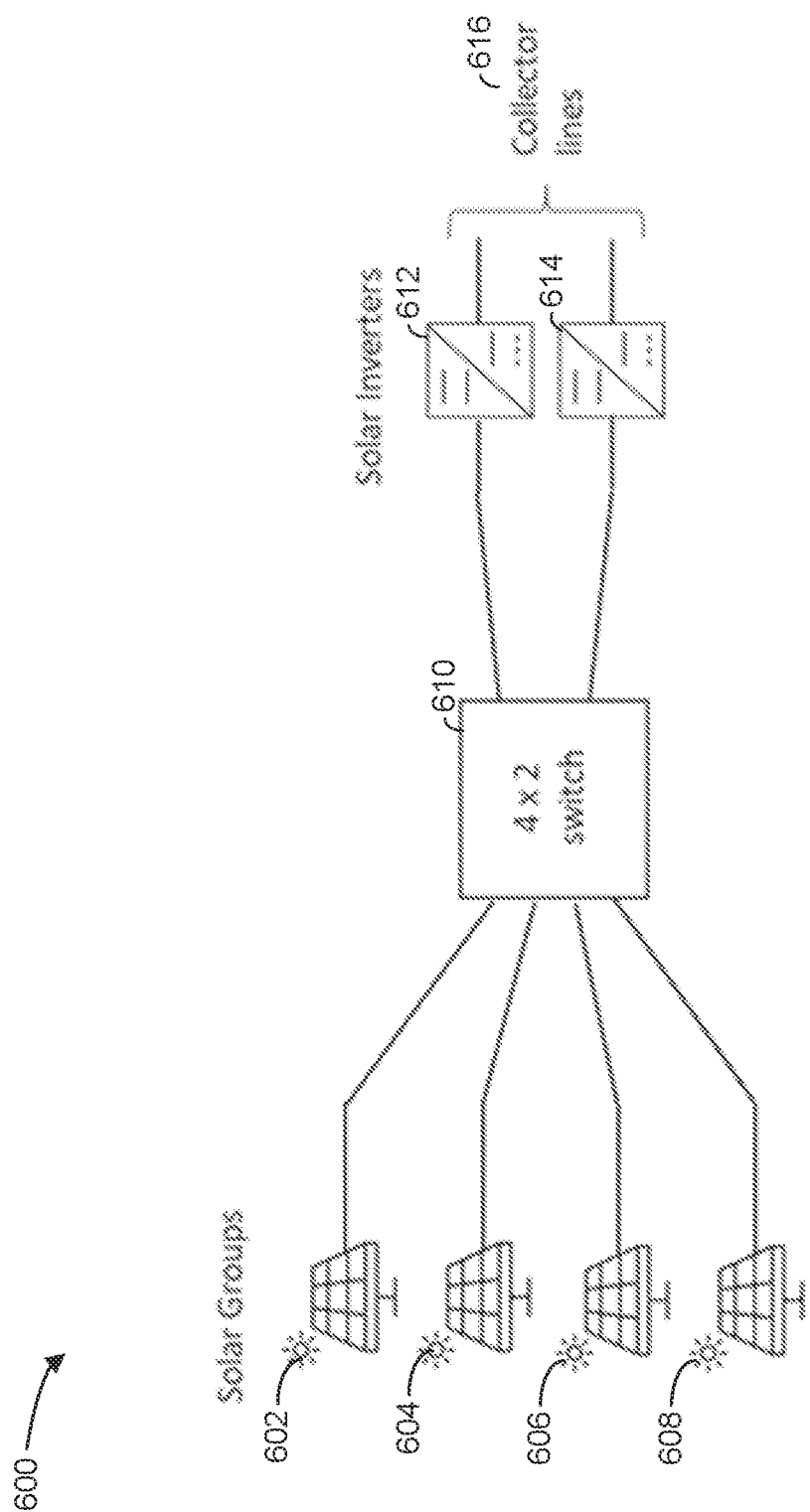
FIG. 6A illustrates a system for switching solar module groups between inverters, according to some embodiments.

FIG. 6A illustrates a system 600 for switching solar module groups between inverters, according to some embodiments. The elements of the system 600 can be the same as or similar to the elements shown and described with reference to FIG. 2. The system 600 can include solar module groups 602-608 (e.g., solar module groups similar to the solar module groups 206 and 208), a switching system 610 (e.g., the switching system 210), inverters 612 and 614 (e.g., inverters similar to or the same as the inverters 212 and 214), and collector lines 616. The solar module groups 602-608 can be connected with the inverters 612 and 614 through the switching system 610. The solar module groups 602-608 can be connected with the inverters 612 and 614. The inverters 612-614 can output power or energy to a transformer (e.g., a step-up transformer) connected to a utility grid through collector lines 616. The collector lines 616 can be lines that operate at medium or high voltages (e.g., medium or high AC voltages). The switching system 610 can enable any of the solar module groups 602-608 to connect with any of the inverters 612 and 614. The switching system 610 can be a 4×2 switch. A controller (e.g., the energy manager 204) can control the position or configuration of the switching system 610 to control the connections between the solar module groups 602-608 and the inverters 612 and 614.

Figure 6C:
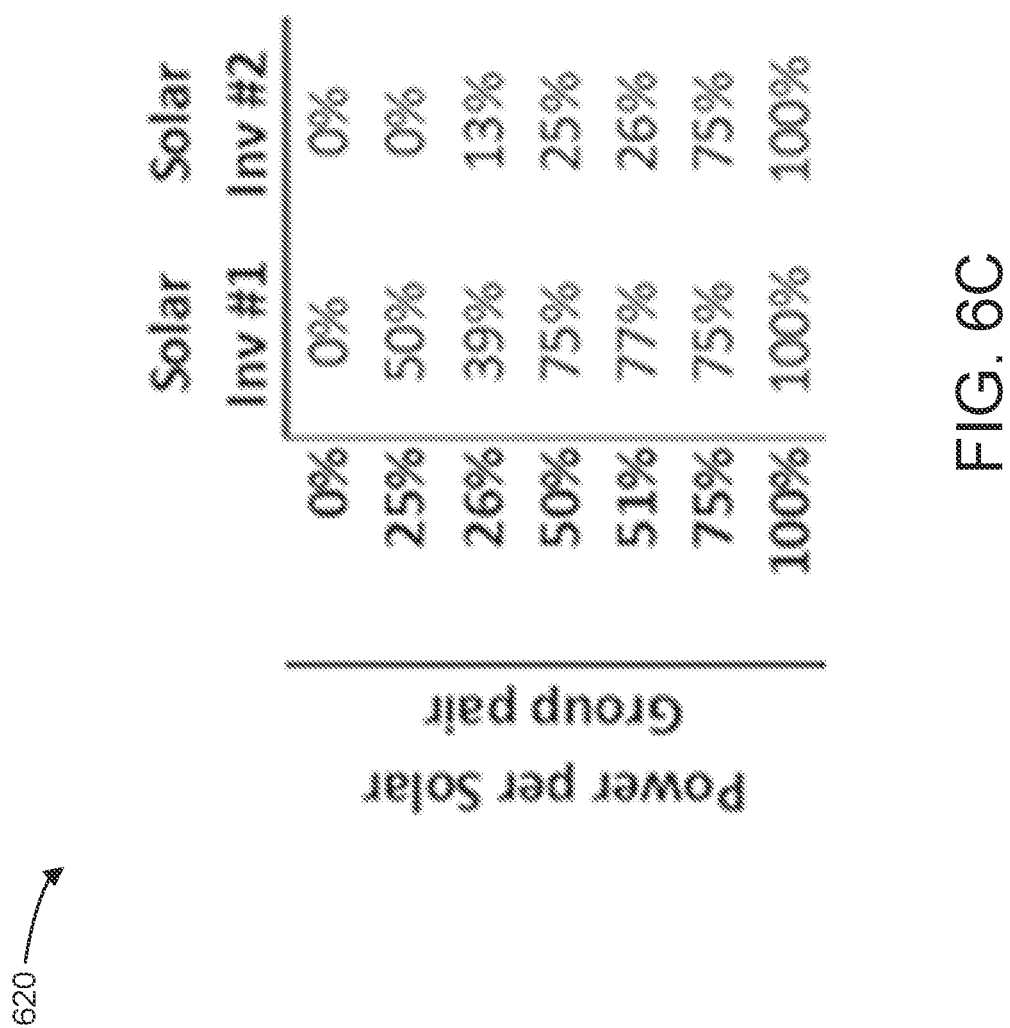
FIG. 6C illustrates a schedule for switching solar module groups between inverters, according to some embodiments.

For example, FIGS. 6B and 6C illustrate schedules 618 and 620 for switching solar module groups between inverters, according to some embodiments. The schedules 618 and 620 can indicate how the system 600 can be configured for maximum efficiency at various values of power per solar group. To facilitate comparisons to, for example, the schedules of illustrated in FIGS. 5B and 5C, the "power per solar group" dimension is shown as "power per solar group pair", which can be the maximum percentage of a single inverter output power that could be driven by a pair of solar module groups. As illustrated, compared with the schedule of FIG. 5C, there can be differences in the levels of inverter loading at given per-solar-group power points. For example, at the 51% power level, in FIG. 5C, each of the inverters can be driven at 51%. However, in FIG. 6C, Solar Inverter #1 can be driven at 77% and Solar Inverter #2 at only 26%.

The schedule 620 can be advantageous for certain efficiency curves. To illustrate the advantages of implementing a schedule such as the schedule 620, the efficiency of an inverter can be 99.9% at 100% power, 90% at 90% power, 80% at 80% power, and so forth, but 50% at 50% power or below. Then, if two inverters operate at 51% power (as is illustrated in FIG. 5C), their total efficiency can be at 51%. However, if the two inverters operate at 77% and 26% (as in FIG. 6C) their total efficiency will be 1−{(1−77%)×77%+ (1−50%)×26%}/(77%+26%)=70% —which is higher than 51%. This result arises because the efficiency curve is concave upwards (e.g., configurations with more solar module groups than inverters can offer advantages in regimes where the inverter efficiency curve is concave upwards).

In some cases, it can be beneficial for the inverters of a system, such as those in the systems 200, 400, 500, or 600, to have different capacities. For example, it can be beneficial to replace an inverter (e.g., the inverter 212) with a set of, for example, four smaller inverters with a capacity equal to 50%, 20%, 20% and 10% of the capacity of the other inverters. Using the system 500, which includes a 10×10 configuration, as an example, if each of the inverters has a power capacity (e.g., at maximum efficiency) of Q MW, the design can be improved by replacing the first inverter (e.g., the inverter 524) with a set of four smaller inverters with capacities of Q/2 MW, 2/5×Q MW, 2/5×Q MW and Q/10 MW. The switching system 522 can be changed to be a 10×13 switch. A controller can operate the switching system 522 according to the following algorithm:

If the power per solar group is less than 1%, all the power can be delivered to the smallest (Q/10 MW) inverter.

If the power per solar group is between 1% and 2%, all the power can be delivered to one of the 2/5×Q inverters or split between the Q/10 inverter and one of the 2/5×Q inverters.

If the power per solar group is between 2% and 3%, the power can be split between a Q/10 inverter and one 2/5×Q inverter.

If the power per solar group is between 3% and 4%, the power can be split between the two 2/5×Q inverters.

If the power per solar group is between 4% and 5%, the two 2/5×Q inverters can be fully powered, and the residual power sent to the Q/10 inverter.

If the power per solar group is between 5% and 6%, the Q/2 inverter can be fully powered, and the residual power can be sent to the Q/10 inverter.

If the power per solar group is between 6% and 7%, the Q/2 inverter and Q/10 inverter can be fully powered, and residual power can be sent to a 2/5×Q inverter. Or, the Q/2 inverter can be fully powered, and all the residual power can be sent to a 2/5 Q inverter.

If the power per solar group is between 7% and 8%, the Q/2 inverter and a 2/5×Q inverter can be fully powered, and residual power sent to the Q/10 inverter.

If the power per solar group is between 8% and 9%, the Q/2 inverter and one 2/5×Q inverter can be fully powered, and the residual power sent either to the other 2/5×Q inverter or split between that inverter and the (fully powered) Q/10 inverter.

If the power per solar group is between 9% and 10%, the Q/2 inverter and both 2/5×Q inverters can be fully powered, and the residual power sent to the Q/10 inverters.

For any power above 10%, a combination of the other inverters could deliver power in increments of 10%, and the residual power can be addressed in increments of 1% as above.

The above algorithm can be changed for any sized increments (e.g., such as 0.1% increments).

Figure 7:
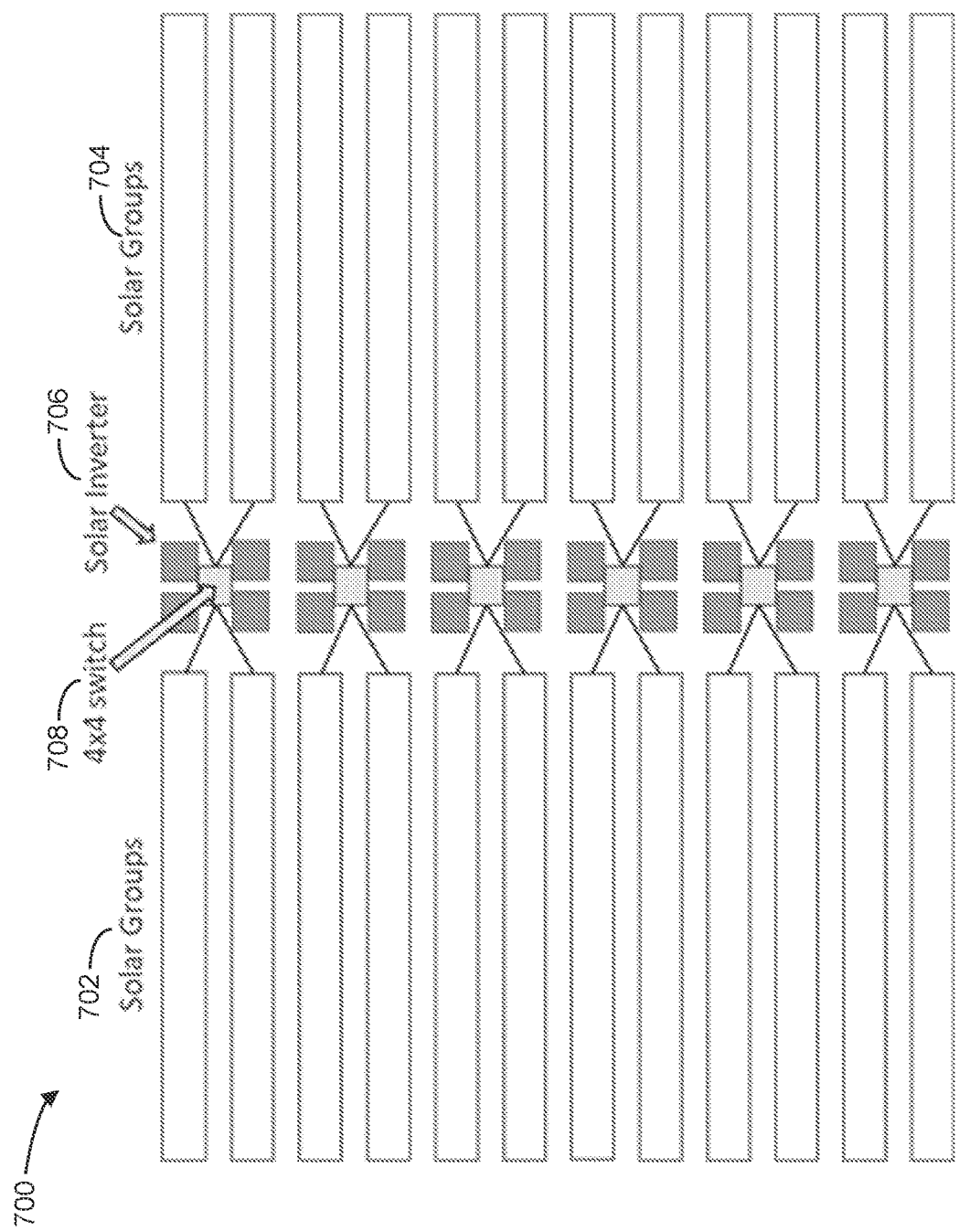
FIG. 7 illustrates a layout for providing solar energy to solar inverters, according to some embodiments.

In large solar arrays, layout considerations can limit the size of N in an N×N configuration: as N increases, DC cable runs can get longer, resulting in increased electrical losses. A layout 700 illustrated in FIG. 7 can reduce the problem of longer DC cable runs and resulting electrical losses. The layout 700 can include solar module groups 702, solar module groups 704, inverters 706, and switching systems 708. In the layout 700, each switching system 708 can be clustered with four inverters 706 (e.g., in a tight layout) and can connect the four inverters 706 with two solar module groups 702 and two solar module groups 704. Two solar module groups 704 and two inverters 706 can be connected with a switching system 708 on one side of the switching system 708 and two other solar module groups 704 and two inverters 706 can be connected on the opposite side of the switching system. This mirror layout can be reproduced any number times in a straight line when looked at from above (e.g., directly above). The layout can keep the DC lines from each solar module group shorter because the solar module groups can remain closer to the centerline of the switching systems 708 to which the solar module groups 702 and 704 are connected. (e.g., cause the connections with the switching systems 708 to approach the switching systems 708 at less acute angles).

In one aspect, the present disclosure describes a solar power system. The solar power system can include a plurality of solar module groups each comprising one or more first solar modules; a plurality of inverters; and a switching system connected to (e.g., configured to connect to) the plurality of solar module groups and the plurality of inverters. The switching system can comprise one or more switches. The processor can monitor the power output of the solar module groups. Based on the monitoring, the processor can determine whether a condition is satisfied. Responsive to determining the condition is satisfied, the processor can transmit a control signal to the switching system to change the position of the switching system. The processor can change the position of the switching system based on the condition that was satisfied. The processor can transmit control signals to shut down any inverters that were previously on under the previous position of the switching system that are disconnected from any solar module groups under the new position. The processor can transmit control signals to power on any inverters that were previously off under the previous position of the switching system that are connected with at least one solar module group under the new position. The processor can change the position of the switching system and the on and/or off states of the inverters over time as the processor determines that new conditions are satisfied that correspond to new positions.

In one aspect, the present disclosure describes a solar power system. The solar power system can include, a first solar module group comprising one or more first solar modules; second solar module group comprising one or more second solar modules; a first inverter; a second inverter; and a switching system connected to the first solar module group and the second solar module group and the first inverter and the second inverter, the switching system comprising one or more switches. The switching system can be configured to connect the first and second solar module groups in (i) a first position in which the first solar module group outputs energy to the first inverter and the second solar module group outputs energy to the second inverter, and, when a combined output of the first solar module group and the second solar module group is below a threshold percentage of a maximum output of the first inverter or the second inverter, (ii) a second position in which the first solar module group and the second solar module group energy to the first inverter.

In some embodiments, switching the switching system from the first position to the second position causes the second solar module group to disconnect from the second inverter. In some embodiments, in the first position, the first solar module group outputs energy to the first inverter and not the second inverter and the second solar module group outputs energy to the second inverter and not the first inverter. In some embodiments, the solar power system includes a controller comprising a processor coupled with memory. The processor can change a state of the second inverter from an on state to an off state upon changing the position of the switching system from the first position to the second position. In some embodiments, the threshold percentage is based on the number of solar module groups that are configured to couple with the first inverter and the second inverter through the switching system. In some embodiments, the threshold percentage is 50%.

In some embodiments, the switching system is in the first position and is configured to connect the first and second solar module groups in a third position in which the first and second solar module groups are connected to the second solar inverter. The solar power system can include a controller including a processor coupled with memory. The processor can determine the combined output of the first solar module group and the second solar module group is below the threshold percentage of the maximum output of the first inverter or the second inverter; determine the switching system was in the second position immediately prior to being in the first position; and adjust the switching system from the first position to the third position. In some embodiments, the first solar module group is not connected to the first inverter in the third position.

In some embodiments, the solar power system includes a third solar module group comprising one or more third solar modules; and a third inverter. In the first position, the switching system can connect the first solar module group and the third solar module group with the first inverter, and the switching system connects the second solar module group with the second inverter. In the first position, the switching system can connect the first solar module group, the second solar module group, and the third solar module group with the first inverter. When a combined output of the first solar module group, the second solar module group, and the third solar module group is above the threshold percentage of the maximum output of the first inverter, the second inverter, or third inverter, in a third position, the switching system can connect the first solar module group with the first inverter, the switching system connects the second solar module group with the second inverter, and the switching system connects the third solar module group with the third inverter.

In some embodiments, the solar power system includes a third solar module group comprising one or more third solar modules. In the first position, the switching system can connect the first solar module group and the third solar module group with the first inverter, and the switching system connects the second solar module group with the second inverter. In the second position, the switching system can connect the first solar module group, the second solar module group, and the third solar module group with the first inverter. When the combined output of the first solar module group, the second solar module group, and the third module is above the threshold percentage of the maximum output of the first inverter or the second inverter, in a third position, the switching system connects the first solar module group with the first inverter, the switching system connects the second solar module group with the second inverter, and the switching system connects the third solar module group with the second inverter.

In some embodiments, the maximum output is a maximum efficiency power output of the first inverter or the second inverter. In some embodiments, the first inverter and the second inverter have different power capacities. In some embodiments, the solar power system includes a third inverter configured to couple with the first solar module group and the second solar module group through the switching system, the third inverter having a different power capacity than the first inverter and the second inverter. In some embodiments, the first inverter has a lower power capacity than each of the second inverter and the third inverter. The system can include a controller including a processor coupled with memory. The processor can connect the first solar module group and the second solar module group with the first inverter responsive to determining the combined output of the first solar module group and the second solar module group is below a lowest threshold of a plurality of thresholds. In some embodiments, the lowest threshold is 1% and the plurality of thresholds include thresholds incremented by 1% from the lowest threshold.

In some embodiments, the first solar module group and the first inverter are located on a first side of the switching system and the second solar module group and the second inverter are located on a second side of the switching system opposite the first side as viewed from directly above the switching system. In some embodiments, the solar power system includes a third solar module group connected to the first inverter and located on the first side of the switching system, the third solar module group comprising one or more third solar modules; and a fourth solar module group connected to the second inverter and located on the second side of the switching system.

In one aspect, the present disclosure describes a method. The method can include determining, by a controller, that a combined output of a first solar module group and a second solar module group is at least a threshold percentage of a maximum power output of a first inverter or a second inverter, the first solar module group comprising one or more first solar modules and the second solar module group comprising one or more second solar modules; responsive to the determining that the combined output of the first solar module group and the second solar module group is at least the threshold percentage of the maximum power output of the first inverter or the second inverter, signaling, from the controller to a switching system including one or more switches, to connect the first solar module group to the first inverter and the second solar module group to the second inverter; determining, by the controller, the combined output of the first solar module group and the second solar module group is less than the threshold percentage of the maximum power output of the first inverter or the second inverter; and responsive to the determining that the combined output of the first solar module group and the second solar module group is less than the threshold percentage of the maximum power output of the first inverter or the second inverter, signaling, from the controller to the switching system, to connect the first solar module group and the second solar module group to the first inverter and to shut down the second inverter. In some embodiments, the threshold percentage is 50%.

In one aspect, a non-transitory computer-readable media comprising computer-executable instructions embodied thereon is described. The non-transitory computer-readable media can be executed by a processor to cause the processor to perform a process. The process can include determining that a combined output of a first solar module group and a second solar module group is at least a threshold percentage of a maximum power output of a first inverter or a second inverter, the first solar module group comprising one or more first solar modules and the second solar module group comprising one or more second solar modules; responsive to the determining that the combined output of the first solar module group and the second solar module group is at least the threshold percentage of the maximum power output of the first inverter or the second inverter, signaling, to a switching system including one or more switches, to connect the first solar module group to the first inverter and the second solar module group to the second inverter; determining the combined output of the first solar module group and the second solar module group is less than the threshold percentage of the maximum power output of the first inverter or the second inverter; and responsive to the determining that the combined output of the first solar module group and the second solar module group is less than the threshold percentage of the maximum power output of the first inverter or the second inverter, signaling, to the switching system, to connect the first solar module group and the second solar module group to the first inverter and to shut down the second inverter.

In one aspect, a solar power system is disclosed. The solar power system can include a first solar module group comprising one or more first solar modules; a second solar module group comprising one or more second solar modules; a first inverter coupled (e.g., connected) with the first solar module group and the second solar module group; a second inverter coupled (e.g., connected) with the first solar module group and the second solar module group; and a controller comprising a processor coupled with memory. The processor can operate the first inverter and the second inverter in a first control position in which the first inverter draws energy from the first solar module group and the second inverter draws energy from the second solar module. The processor can, when a combined output of the first solar module group and the second solar module group is below a threshold percentage of a maximum output of the first inverter or the second inverter, operate the first inverter and the second inverter in a second control position in which the first inverter draws energy from the first solar module group and the second module group.

In some embodiments, the processor, responsive to determining the combined output of the first solar module group and the second solar module group is below the threshold percentage of the maximum output of the first inverter or the second inverter, transmits a first signal to the first inverter to change a state of the first inverter from not drawing power or energy from the second solar module group to drawing power or energy from the second solar module group. In some embodiments, the processor, responsive to determining the combined output of the first solar module group and the second solar module group is below the threshold percentage of the maximum output of the first inverter or the second inverter, transmits a second signal to the second inverter to change a state of the second inverter from drawing power or energy from the second solar module group to not draw power or energy from the second solar module group.

In some embodiments, the processor, responsive to determining the combined output of the first solar module group and the second solar module group is below the threshold percentage of the maximum output of the first inverter or the second inverter, transmits a signal to the second inverter to change a state of the second inverter from an on state to an off state. In some embodiments, the threshold percentage is 50%. In some embodiments, the first inverter and the second inverter are in the first control position, and the processor determines the combined output of the first solar module group and the second solar module group is below the threshold percentage of the maximum output of the first inverter or the second inverter; determines the first inverter and the second inverter were in the second control position immediately prior to being in the first control position; and adjusts the control position from the first control position to a third control position in which the second inverter draws energy from the first solar module group and the second module group.

In some embodiments, the first inverter does not draw energy from the first inverter in the third control position. In some embodiments, the maximum output is a maximum efficiency power output of the first inverter or the second inverter. In some embodiments, the first inverter and the second inverter have different power capacities. In some embodiments, the solar power system includes a third inverter coupled with the first solar module group and the second solar module group, the third inverter having a different power capacity than the first inverter and the second inverter.

In one aspect, the present disclosure describes a method. The method can include determining, by a controller, that a combined output of a first solar module group and a second solar module group is at least a threshold percentage of a maximum power output of a first inverter or a second inverter, the first solar module group comprising one or more first solar modules and coupled (e.g., connected) with the first inverter and the second inverter and the second solar module group comprising one or more second solar modules and coupled (e.g., connected) with the first inverter and the second inverter; responsive to the determining that the combined output of the first solar module group and the second solar module group is at least the threshold percentage of the maximum power output of the first inverter or the second inverter, signaling, from the controller, to the first inverter to draw energy from the first solar module group and to the second inverter to draw energy from the second solar module group; determining, by the controller, the combined output of the first solar module group and the second solar module group is less than the threshold percentage of the maximum power output of the first inverter or the second inverter; and responsive to the determining that the combined output of the first solar module group and the second solar module group is less than the threshold percentage of the maximum power output of the first inverter or the second inverter, signaling, from the controller, to the first inverter to draw energy from the second solar module group, and to the second solar module group to stop drawing energy from the second inverter. In some embodiments, the threshold percentage is 50%. In some embodiments, the threshold percentage is based on the number of solar module groups that are coupled with the first inverter and the second inverter.

In one aspect, a non-transitory computer-readable media comprising computer-executable instructions embodied thereon is described. The non-transitory computer-readable media can be executed by a processor to cause the processor to perform a process. The process can include determining that a combined output of a first solar module group and a second solar module group is at least a threshold percentage of a maximum power output of a first inverter or a second inverter, the first solar module group comprising one or more first solar modules and coupled (e.g., connected) with the first inverter and the second inverter and the second solar module group comprising one or more second solar modules and coupled (e.g., connected) with the first inverter and the second inverter; responsive to the determining that the combined output of the first solar module group and the second solar module group is at least the threshold percentage of the maximum power output of the first inverter or the second inverter, signaling to the first inverter to draw energy from the first solar module group and to the second inverter to draw energy from the second solar module group; determining the combined output of the first solar module group and the second solar module group is less than the threshold percentage of the maximum power output of the first inverter or the second inverter; and responsive to the determining that the combined output of the first solar module group and the second solar module group is less than the threshold percentage of the maximum power output of the first inverter or the second inverter, signaling to the first inverter to draw energy from the second solar module group, and to the second solar module group to stop drawing energy from the second inverter.

Computing Environment

Having discussed specific embodiments of the present solution, it may be helpful to describe aspects of the operating environment as well as associated system components (e.g., hardware elements) in connection with the methods and systems described herein.

Figure 8A:
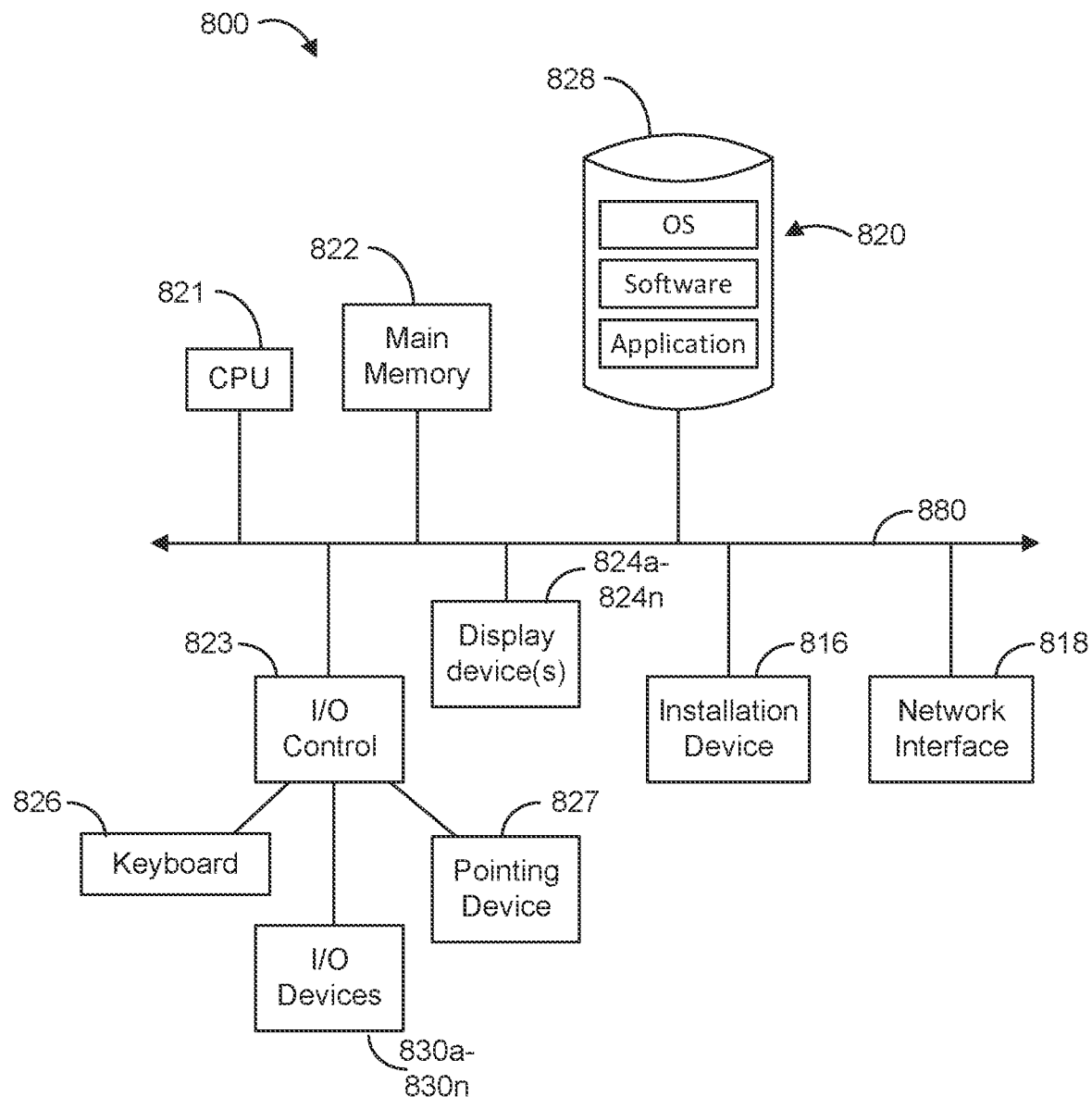
FIGS. 8A and 8B are block diagrams depicting embodiments of computing devices useful in connection with the methods and systems described herein.
Figure 8B:
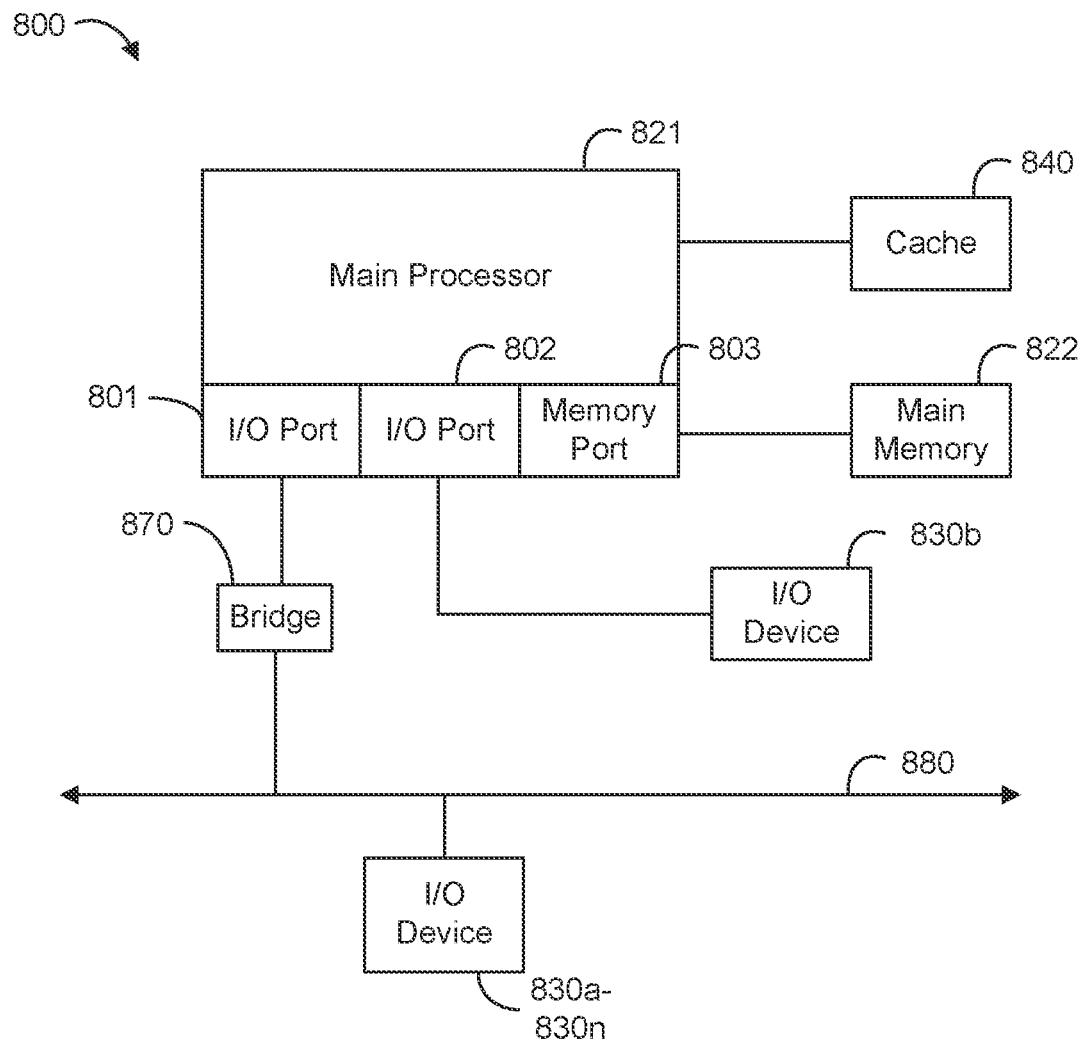

The systems discussed herein may be deployed as and/or executed on any type and form of computing device, such as a computer, network device or appliance capable of communicating on any type and form of network and performing the operations described herein. FIGS. 8A and 8B depict block diagrams of a computing device 800 useful for practicing an embodiment of the systems and methods described herein. As shown in FIGS. 8A and 8B, each computing device 800 includes a central processing unit 821, and a main memory unit 822. As shown in FIG. 8A, a computing device 800 may include a storage device 828, an installation device 816, a network interface 818, an I/O controller 823, display devices 824a-824n, a keyboard 826 and a pointing device 827, such as a mouse. The storage device 828 may include, without limitation, an operating system and/or software. As shown in FIG. 8B, each computing device 800 may also include additional optional elements, such as a memory port 803, a bridge 870, one or more input/output devices 830a-830n (generally referred to using reference numeral 830), and a cache memory 840 in communication with the central processing unit 821.

The central processing unit 821 is any logic circuitry that responds to and processes instructions fetched from the main memory unit 822. In many embodiments, the central processing unit 821 is provided by a microprocessor unit, such as: those manufactured by Intel Corporation of Mountain View, California; those manufactured by International Business Machines of White Plains, New York; or those manufactured by Advanced Micro Devices of Sunnyvale, California. The computing device 800 may be based on any of these processors, or any other processor capable of operating as described herein.

The main memory unit 822 may be one or more memory chips capable of storing data and allowing any storage location to be directly accessed by the central processing unit 821, such as any type or variant of Static random-access memory (SRAM), Dynamic random-access memory (DRAM), Ferroelectric RAM (FRAM), NAND Flash, NOR Flash and Solid-State Drives (SSD). The main memory unit 822 may be based on any of the above-described memory chips, or any other available memory chips capable of operating as described herein. In the embodiment shown in FIG. 8A, the central processing unit 821 communicates with main memory unit 822 via a system bus 880 (described in more detail below). FIG. 8B depicts an embodiment of a computing device 800 in which the processor communicates directly with the main memory unit 822 via a memory port 803. For example, in FIG. 8B the main memory unit 822 may be DRDRAM.

FIG. 8B depicts an embodiment in which the central processing unit 821 communicates directly with cache memory 840 via a secondary bus, sometimes referred to as a backside bus. In other embodiments, the central processing unit 821 communicates with cache memory 840 using the system bus 880. Cache memory 840 typically has a faster response time than main memory unit 822 and is provided by, for example, SRAM, BSRAM, or EDRAM. In the embodiment shown in FIG. 8B, the central processing unit 821 communicates with various I/O devices 830 via a local system bus 880. Various buses may be used to connect the central processing unit 821 to any of the I/O devices 830, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 824, the central processing unit 821 may use an Advanced Graphics Port (AGP) to communicate with the display 824. FIG. 8B depicts an embodiment of a computer 800 in which the central processing unit 821 may communicate directly with I/O device 830*b*, for example via HYPERTRANSPORT, RAPIDIO, or INFINTBAND communications technology. FIG. 8B also depicts an embodiment in which local busses and direct communication are mixed: the central processing unit 821 communicates with I/O device 830*a* using a local interconnect bus while communicating with I/O device 830*b* directly.

A wide variety of I/O devices 830*a*-830*n* may be present in the computing device 800. Input devices include keyboards, mice, trackpads, trackballs, microphones, dials, touch pads, touch screens, and drawing tablets. Output devices include video displays, speakers, inkjet printers, laser printers, projectors, and dye-sublimation printers. The I/O devices may be controlled by an I/O controller 823 as shown in FIG. 8A. The I/O controller may control one or more I/O devices such as a keyboard 826 and a pointing device 827, e.g., a mouse or optical pen. Furthermore, an I/O device may also provide storage and/or an installation device 816 for the computing device 800. In still other embodiments, the computing device 800 may provide USB connections (not shown) to receive handheld USB storage devices such as the USB Flash Drive line of devices manufactured by Twintech Industry, Inc., of Los Alamitos, California.

Referring again to FIG. 8A, the computing device 800 may support any suitable installation device 816, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 800 may further include a storage device, such as one or more hard disk drives or redundant arrays of independent disks, for storing an operating system and other related software, and for storing application software programs such as any program or software 820 for implementing (e.g., configured and/or designed for) the systems and methods described herein. Optionally, any of the installation devices 816 could also be used as the storage device. Additionally, the operating system and the software can be run from a bootable medium.

Furthermore, the computing device 800 may include a network interface 818 to interface to the network 203 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In one embodiment, the computing device 800 communicates with other computing devices 800' via any type and/or form of gateway or tunneling protocol such as Secure Socket Layer (SSL) or Transport Layer Security (TLS). The network interface 818 may include a built-in network adapter, network interface card, PCMCIA network card, card bus network adapter, wireless network adapter, USB network adapter, modem or any other device suitable for interfacing the computing device 800 to any type of network capable of communication and performing the operations described herein.

In some implementations, the computing device 800 may include or be connected to one or more display devices 824*a*-824*n*. As such, any of the I/O devices 830*a*-830*n* and/or the I/O controller 823 may include any type and/or form of suitable hardware, software, or combination of hardware and software to support, enable or provide for the connection and use of the display device(s) 824*a*-824*n* by the computing device 800. For example, the computing device 800 may include any type and/or form of video adapter, video card, driver, and/or library to interface, communicate, connect or otherwise use the display device(s) 824*a*-824*n*. In one embodiment, a video adapter may include multiple connectors to interface to the display device(s) 824*a*-824*n*. In other embodiments, the computing device 800 may include multiple video adapters, with each video adapter connected to the display device(s) 824*a*-824*n*. In some implementations, any portion of the operating system of the computing device 800 may be configured for using multiple displays 824*a*-824*n*. One ordinarily skilled in the art will recognize and appreciate the various ways and embodiments that a computing device 800 may be configured to have one or more display devices 824*a*-824*n*.

In further embodiments, an I/O device 830 may be a bridge between the system bus 880 and an external communication bus, such as a USB bus, an Apple Desktop Bus, an RS-232 serial connection, a SCSI bus, a FireWire bus, a FireWire 500 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device 800 of the sort depicted in FIGS. 8A and 8B may operate under the control of an operating system, which control scheduling of tasks and access to system resources. The computing device 800 can be running any operating system, such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to, Android, produced by Google Inc.; WINDOWS 7 and 8, produced by Microsoft Corporation of Redmond, Washington; MAC OS, produced by Apple Computer of Cupertino, California; WebOS, produced by Research In Motion (RIM); OS/2, produced by International Business Machines of Armonk, New York; and Linux, a freely-available operating system distributed by Caldera Corp. of Salt Lake City, Utah, or any type and/or form of a Unix operating system, among others.

The computer system 800 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 800 has sufficient processor power and memory capacity to perform the operations described herein.

In some implementations, the computing device 800 may have different processors, operating systems, and input devices consistent with the device. For example, in one embodiment, the computing device 800 is a smart phone, mobile device, tablet or personal digital assistant. In still other embodiments, the computing device 800 is an Android-based mobile device, an iPhone smart phone manufactured by Apple Computer of Cupertino, California, or a Blackberry or WebOS-based handheld device or smart phone, such as the devices manufactured by Research In Motion Limited. Moreover, the computing device 800 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Although the disclosure may reference one or more "users", such "users" may refer to user-associated devices or stations (STAs), for example, consistent with the terms "user" and "multi-user" typically used in the context of a multi-user multiple-input and multiple-output (MU-MIMO) environment.

Although examples of communications systems described above may include devices operating according to an 802.11 standard, it should be understood that embodiments of the systems and methods described can operate according to other standards and use wireless communications devices other than devices configured as devices and APs. For example, multiple-unit communication interfaces associated with cellular networks, satellite communications, vehicle communication networks, and other non-802.11 wireless networks can utilize the systems and methods described herein to achieve improved overall capacity and/or link quality without departing from the scope of the systems and methods described herein.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some implementations, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

While operations are depicted in the drawings in a particular order, such operations are not required to be performed in the particular order shown or in sequential order, and all illustrated operations are not required to be performed. Actions described herein can be performed in a different order.

Any references to implementations or elements or acts of the systems and methods herein referred to in the singular can also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above-described embodiments, methods, and examples, but by all embodiments and methods within the scope and spirit of the disclosure.

What is claimed is:

1. A solar power system comprising:
  a first solar module group comprising one or more first solar modules;
  a second solar module group comprising one or more second solar modules;
  a first inverter coupled with the first solar module group and the second solar module group;
  a second inverter coupled with the first solar module group and the second solar module group; and
  a controller comprising a processor coupled with memory, wherein the processor:
    (i) operates the first inverter and the second inverter in a first control position in which the first inverter draws energy from the first solar module group and the second inverter draws energy from the second solar module, and,
    when a combined output of the first solar module group and the second solar module group is below a threshold percentage of a maximum output of the first inverter or the second inverter, (ii) operates the first inverter and the second inverter in a second control position in which the first inverter draws energy from the first solar module group and the second module group due to the first inverter having a first rated capacity lower than a second rated capacity of the second inverter.

2. The solar power system of claim 1, wherein the processor:
  responsive to determining the combined output of the first solar module group and the second solar module group is below the threshold percentage of the maximum output of the first inverter or the second inverter, transmits a first signal to the first inverter to change a state of the first inverter from not drawing energy from the second solar module group to drawing energy from the second solar module group.

3. The solar power system of claim 2, wherein the processor:
  responsive to determining the combined output of the first solar module group and the second solar module group is below the threshold percentage of the maximum output of the first inverter or the second inverter, transmits a second signal to the second inverter to change a state of the second inverter from drawing energy from the second solar module group to not drawing energy from the second solar module group.

4. The solar power system of claim 1, wherein the processor:
  responsive to determining the combined output of the first solar module group and the second solar module group is below the threshold percentage of the maximum output of the first inverter or the second inverter, transmits a signal to the second inverter to change a state of the second inverter from an on state to an off state.

5. The solar power system of claim 1, wherein the threshold percentage is based on the number of solar module groups that are coupled with the first inverter and the second inverter.

6. The solar power system of claim 1, wherein the first inverter and the second inverter are in the first control position, and the processor:
  determines the combined output of the first solar module group and the second solar module group is below the threshold percentage of the maximum output of the first inverter or the second inverter;
  determines the first inverter and the second inverter were in the second control position immediately prior to being in the first control position; and
  adjusts the control position from the first control position to a third control position in which the second inverter draws energy from the first solar module group and the second module group.

7. The solar power system of claim 6, wherein the first inverter does not draw energy from the first inverter in the third control position.

8. The solar power system of claim 1, wherein the maximum output is a maximum efficiency power output of the first inverter or the second inverter.

9. The solar power system of claim 1, comprising:
  a third inverter coupled with the first solar module group and the second solar module group, the third inverter having a different power capacity than the first inverter and the second inverter.

10. A method comprising:
  determining, by a controller, that a combined output of a first solar module group and a second solar module group is at least a threshold percentage of a maximum power output of a first inverter or a second inverter, the first solar module group comprising one or more first solar modules and the second solar module group comprising one or more second solar modules;
  responsive to the determining that the combined output of the first solar module group and the second solar module group is at least the threshold percentage of the maximum power output of the first inverter or the second inverter, signaling, from the controller, to cause the first inverter and the second inverter to be in a first control position in which the first inverter draws power from the first solar module group and the second inverter draws power from the second solar module group;

determining, by the controller, the combined output of the first solar module group and the second solar module group is less than the threshold percentage of the maximum power output of the first inverter or the second inverter; and responsive to the determining that the combined output of the first solar module group and the second solar module group is less than the threshold percentage of the maximum power output of the first inverter or the second inverter, signaling, from the controller, to cause the first inverter and the second inverter to be in a second control position in which the first inverter draws power from the first solar module group and the second solar module and the second inverter is shut down due to the first inverter having a first rated capacity lower than a second rated capacity of the second inverter.

11. The method of claim 10, wherein the threshold percentage is based on the number of solar module groups that are coupled with the first inverter and the second inverter.

12. The method of claim 10, further comprising:
determining the combined output of the first solar module group and the second solar module group is below the threshold percentage of the maximum output of the first inverter or the second inverter;
determining the first inverter and the second inverter were in the second control position immediately prior to being in the first control position; and
adjusting the control position from the first control position to a third control position in which the second inverter draws energy from the first solar module group and the second module group.

13. The method of claim 12, wherein the first inverter does not draw energy from the first inverter in the third control position.

14. A non-transitory computer-readable media comprising computer-executable instructions embodied thereon that, when executed by a processor, cause the processor to perform a process comprising:
determining, by a controller, that a combined output of a first solar module group and a second solar module group is at least a threshold percentage of a maximum power output of a first inverter or a second inverter, the first solar module group comprising one or more first solar modules and the second solar module group comprising one or more second solar modules;
responsive to the determining that the combined output of the first solar module group and the second solar module group is at least the threshold percentage of the maximum power output of the first inverter or the second inverter, signaling, from the controller, to cause the first inverter and the second inverter to be in a first control position in which the first inverter draws power from the first solar module group and the second inverter draws power from the second solar module group;
determining, by the controller, the combined output of the first solar module group and the second solar module group is less than the threshold percentage of the maximum power output of the first inverter or the second inverter; and
responsive to the determining that the combined output of the first solar module group and the second solar module group is less than the threshold percentage of the maximum power output of the first inverter or the second inverter, signaling, from the controller, to cause the first inverter and the second inverter to be in a second control position in which the first inverter draws power from the first solar module group and the second solar module and the second inverter is shut down due to the first inverter having a first rated capacity lower than a second rated capacity of the second inverter.

15. The non-transitory computer-readable media of claim 14, wherein the first inverter and the second inverter are in the first control position, and the processor:
determines the combined output of the first solar module group and the second solar module group is below the threshold percentage of the maximum output of the first inverter or the second inverter;
determines the first inverter and the second inverter were in the second control position immediately prior to being in the first control position; and
adjusts the control position from the first control position to a third control position in which the second inverter draws energy from the first solar module group and the second module group.

16. The non-transitory computer-readable media of claim 14, wherein the maximum output is a maximum efficiency power output of the first inverter or the second inverter.

17. The solar power system of claim 1, further comprising a third inverter coupled with the first solar module group and the second solar module group,
wherein the processor:
responsive to determining the first inverter is fully powered by the combined output of the first solar module group and the second solar module group in the second control position, operates the first inverter, the second inverter, and the third inverter in a third control position in which the third inverter draws energy from the first solar module group and the second module group due to the third inverter having a third rated capacity lower than the second rated capacity of the second inverter and higher than the first rated capacity of the first inverter.

18. The solar power system of claim 17, wherein the processor:
deactivates the first inverter responsive to operating the first inverter, the second inverter, and the third inverter in the third control position from the second control position.

19. The solar power system of claim 18, wherein the processor:
responsive to determining the third inverter is fully powered by the combined output of the first solar module group and the second solar module group in the third control position subsequent to deactivating the first inverter, operates the first inverter, the second inverter, and the third inverter in a fourth control position in which the first inverter and the third inverter draw from the first solar module group and the second module group.

20. The solar power system of claim 1, wherein the threshold is a lowest threshold of a plurality of thresholds of a schedule stored in the memory, wherein the processor:
operates the first inverter and the second inverter in the second control position in which the first inverter draws energy from the first solar module group and the second module group based on the third capacity of the third inverter corresponding to the threshold.

* * * * *